(12) United States Patent
Nakahara

(10) Patent No.: US 10,611,069 B2
(45) Date of Patent: Apr. 7, 2020

(54) INJECTION-MOLDING METHOD FOR MESH FILTER, INJECTION-MOLDING MOLD, AND MESH FILTER

(71) Applicant: ENPLAS CORPORATION, Saitama (JP)

(72) Inventor: Toru Nakahara, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 112 days.

(21) Appl. No.: 15/755,350

(22) PCT Filed: Jul. 8, 2016

(86) PCT No.: PCT/JP2016/070279
§ 371 (c)(1),
(2) Date: Feb. 26, 2018

(87) PCT Pub. No.: WO2017/033592
PCT Pub. Date: Mar. 2, 2017

(65) Prior Publication Data
US 2018/0236701 A1    Aug. 23, 2018

(30) Foreign Application Priority Data

Aug. 26, 2015   (JP) ................................ 2015-166394

(51) Int. Cl.
*B29C 45/40* (2006.01)
*B01D 39/16* (2006.01)
(Continued)

(52) U.S. Cl.
CPC .......... *B29C 45/40* (2013.01); *B01D 29/0093* (2013.01); *B01D 29/39* (2013.01);
(Continued)

(58) Field of Classification Search
CPC ............ B29C 33/44; B29C 2045/0049; B29C 2045/0094
(Continued)

(56) References Cited

U.S. PATENT DOCUMENTS

| 10,293,282 B2* | 5/2019 | Suzuki | .................... B01D 29/11 |
| 2016/0199758 A1* | 7/2016 | Suzuki | .................... B01D 29/11 |
| | | | 210/487 |

(Continued)

FOREIGN PATENT DOCUMENTS

| EP | 3 037 238 | 6/2016 |
| JP | 5-44204 | 6/1993 |

(Continued)

OTHER PUBLICATIONS

International Search Report dated Aug. 16, 2016 in International (PCT) Application No. PCT/JP2016/070279.

*Primary Examiner* — Benjamin M Kurtz
(74) *Attorney, Agent, or Firm* — Wenderoth, Lind & Ponack, L.L.P.

(57) ABSTRACT

A third cavity part for forming a filter part of a mesh filter has opening forming pins of the same number as that of openings for forming regular-octagonal openings of the filter part. The opening forming pins are formed at regular intervals along an X-axis direction and a Y-axis direction, and a diameter of an inscribed circle of the regular octagon is equivalent to the dimension between the adjacent opening forming pins along the X-axis direction and along the Y-axis direction. The interval between a first line and a second line adjacent to the first line of the opening forming pins formed at regular intervals along a direction at 45° to the X-axis direction is equivalent to the interval between a third line (Continued)

and a fourth line adjacent to the third line of the opening forming pins formed at regular intervals along a direction at 135° to the X-axis direction.

15 Claims, 12 Drawing Sheets

(51) Int. Cl.
  *B29C 45/26* (2006.01)
  *B01D 29/39* (2006.01)
  *B01D 29/00* (2006.01)
  *B29C 45/37* (2006.01)
  *B29C 45/00* (2006.01)
  *B29C 33/44* (2006.01)
  *B29L 31/00* (2006.01)
  *B29L 31/14* (2006.01)

(52) U.S. Cl.
  CPC ......... *B01D 39/16* (2013.01); *B01D 39/1692* (2013.01); *B29C 45/2628* (2013.01); *B29C 45/37* (2013.01); *B01D 2201/0415* (2013.01); *B01D 2239/10* (2013.01); *B29C 33/44* (2013.01); *B29C 45/0046* (2013.01); *B29L 2031/14* (2013.01); *B29L 2031/737* (2013.01)

(58) Field of Classification Search
  USPC .................................................. 264/328.12
  See application file for complete search history.

(56) References Cited

U.S. PATENT DOCUMENTS

2016/0303495 A1* 10/2016 Suzuki ............... B01D 29/03
2018/0078881 A1* 3/2018 Suzuki ............... B01D 35/02

FOREIGN PATENT DOCUMENTS

| | | |
|---|---|---|
| JP | 9-39114 | 2/1997 |
| JP | 2003-251661 | 9/2003 |
| JP | 2007-1232 | 1/2007 |
| JP | 2011-72910 | 4/2011 |
| JP | 2015-61742 | 4/2015 |
| WO | 2015/025639 | 2/2015 |
| WO | 2015/133232 | 9/2015 |

* cited by examiner

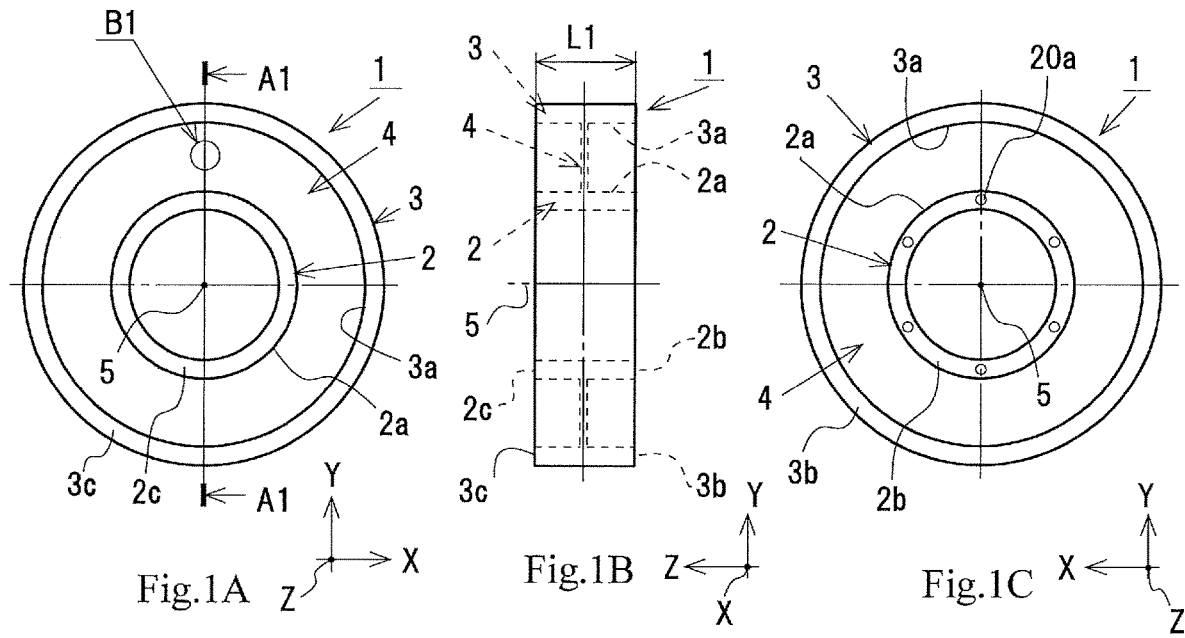
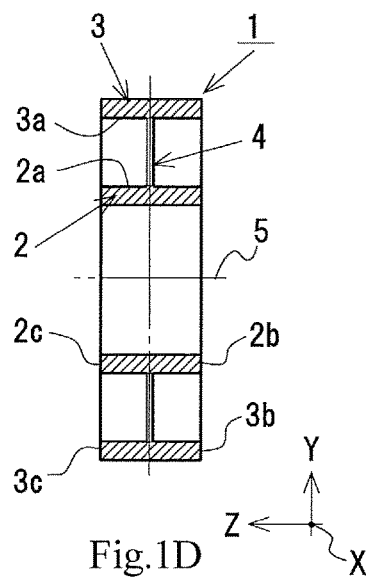

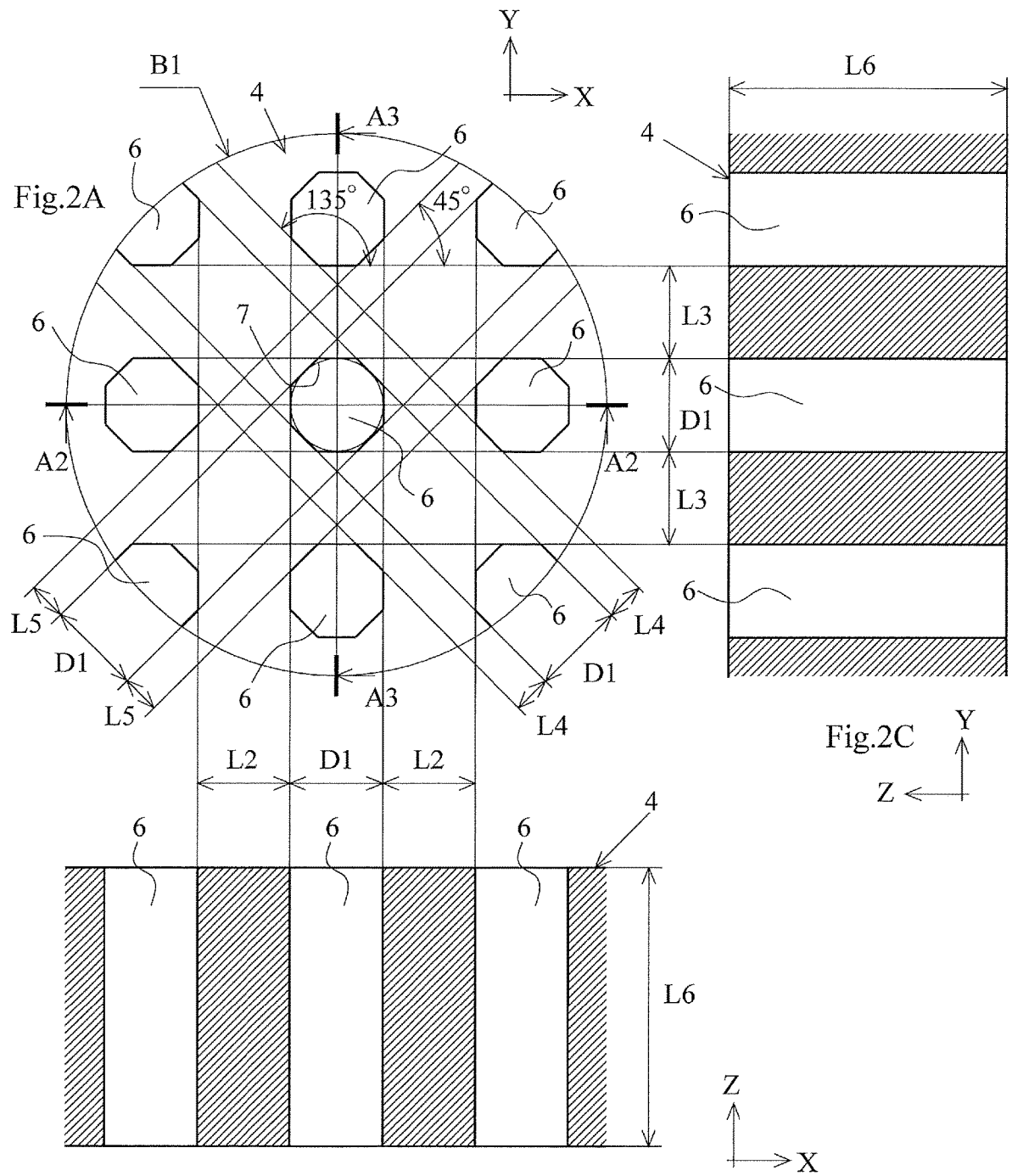

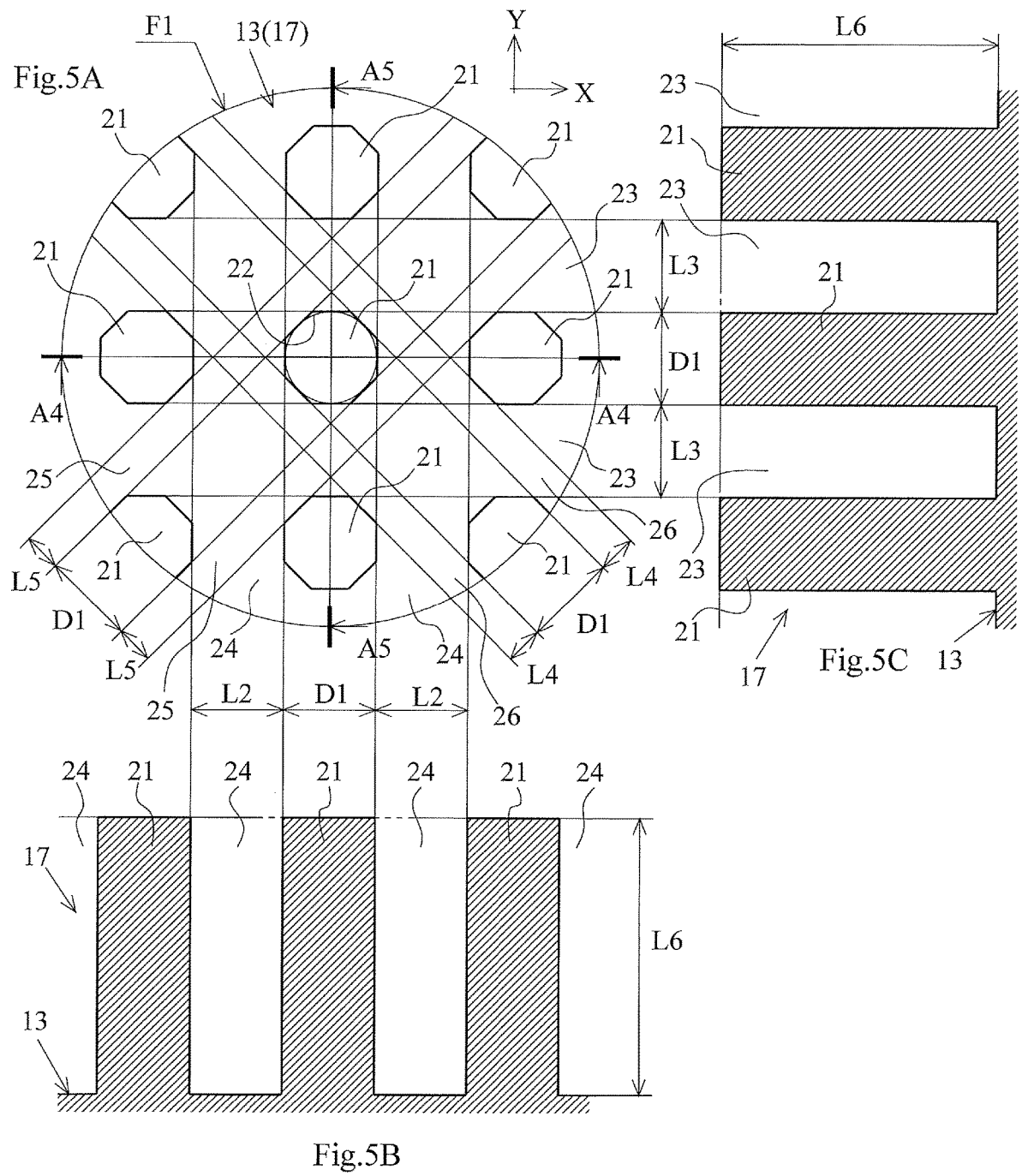

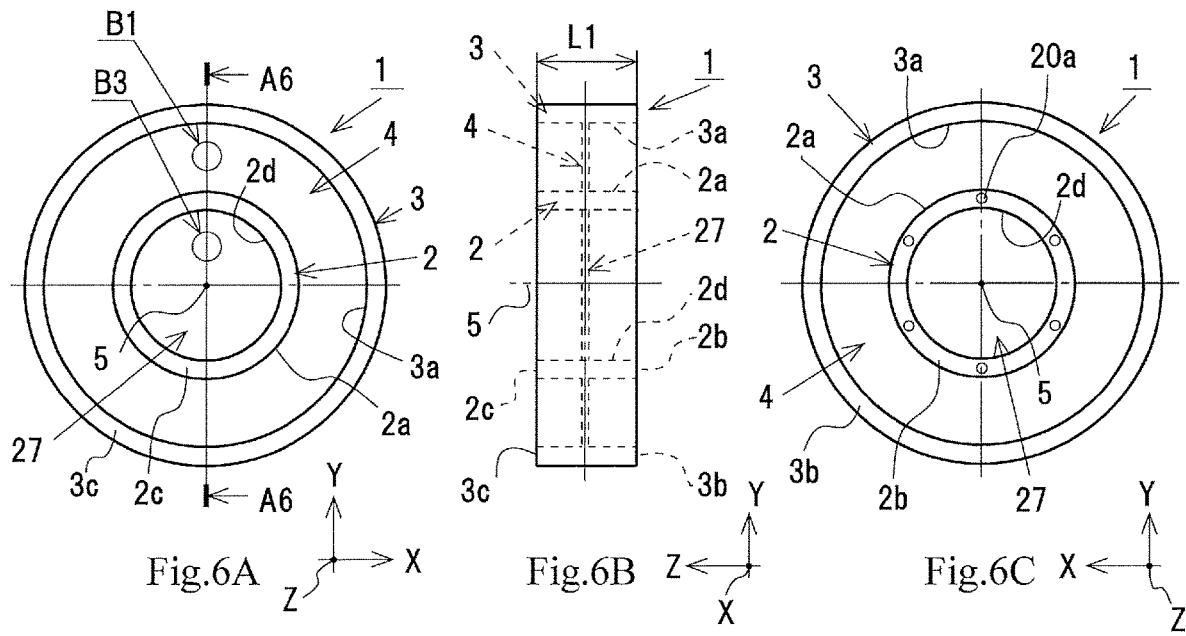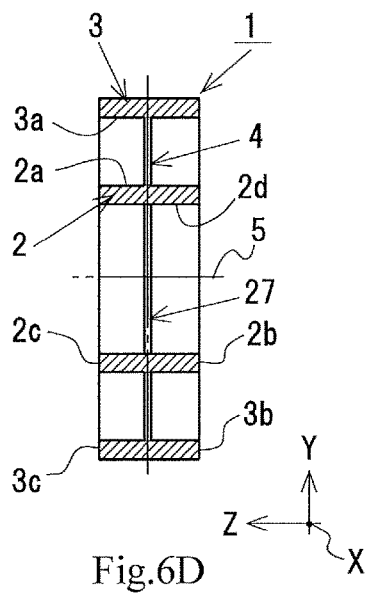

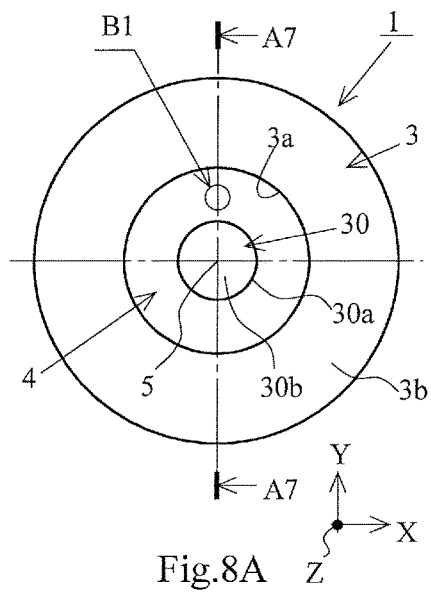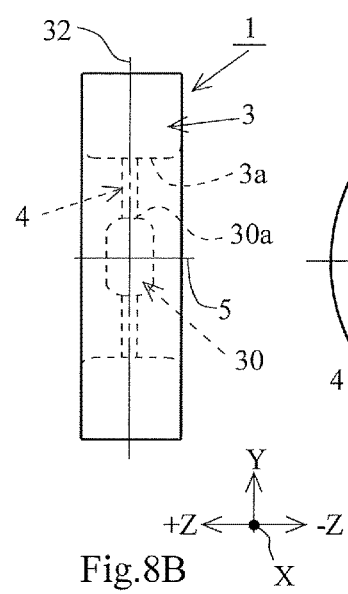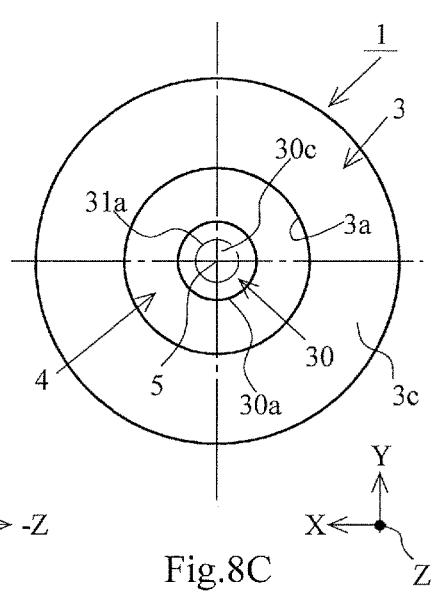
Fig.8A  Fig.8B  Fig.8C
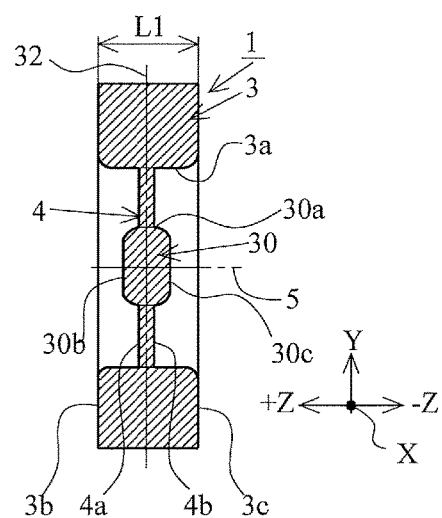
Fig.8D

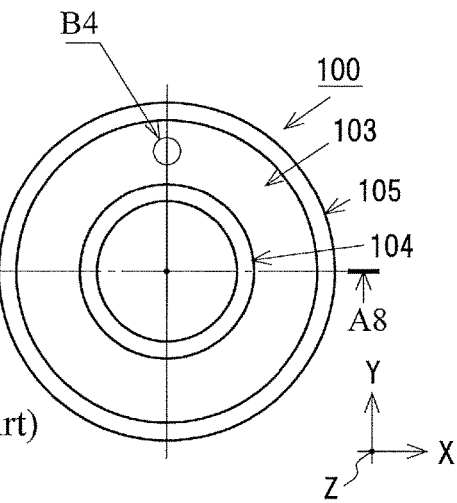
Fig.10A (Related Art)
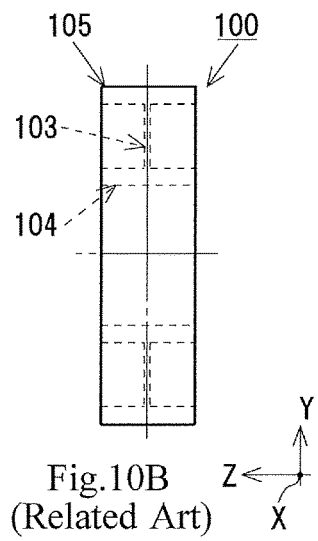
Fig.10B (Related Art)
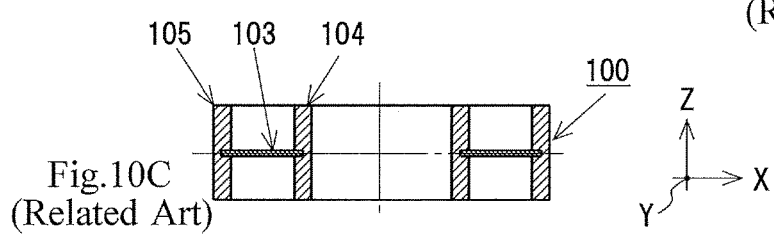
Fig.10C (Related Art)
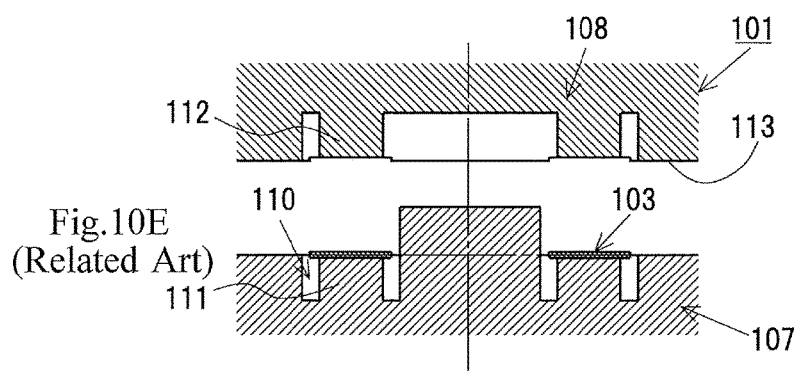
Fig.10E (Related Art)
Fig.10F (Related Art)
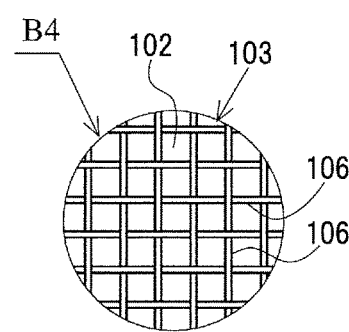
Fig.10D (Related Art)

INJECTION-MOLDING METHOD FOR MESH FILTER, INJECTION-MOLDING MOLD, AND MESH FILTER

TECHNICAL FIELD

The present invention relates to an injection-molding method for a mesh filter used for filtering a foreign substance in a fluid, an injection-molding mold used for injection-molding the mesh filter, and the mesh filter.

BACKGROUND ART

For example, a mesh filter is provided to a middle of an oil pipe in a fuel supply pipe, lubrication device, or the like that is connected to a fuel injection device of an automobile so as to filter out a foreign substance from a fluid such as a fuel or oil.

FIGS. 10A-10F show a conventional mesh filter 100. FIG. 10A is a front view of the conventional mesh filter 100, FIG. 10B is a side view of the conventional mesh filter 100, FIG. 10C is a cross-sectional view of the mesh filter 100 taken along line A8-A8 of FIG. 10A, and FIG. 10D is an enlarged view of a part B4 of FIG. 10A. Also, FIG. 10E is a cross-sectional view of a mold 101 for illustrating a first stage in a forming method of the conventional mesh filter 100, and FIG. 10F is a cross-sectional view of the mold 101 for illustrating a second stage in the forming method of the conventional mesh filter 100.

The conventional mesh filter 100 shown in FIGS. 10A to 10D includes: a mesh member 103 through which an oil can pass and on which a plurality of openings 102 which can filter out a foreign substance (such as metal powder and dust) of a predefined size are formed; a resin inner cylinder 104 installed along an inner circumferential edge of the mesh member 103; and a resin outer cylinder 105 installed along an outer circumferential edge of the mesh member 103. The mesh member 103 is in a hollow disk-like shape in planar view and formed by braiding nylon fibers 106 in a grid-like manner, and rectangular openings 102 are formed between the braided nylon fibers 106.

Such a conventional mesh filter 100 is insert-molded as shown in FIGS. 10E to 10F. First, a first mold 107 and a second mold 108 are opened and the mesh member 103 is placed on a pedestal 111 in a cavity 110 of the first mold 107 (see FIG. 10E). Then, the second mold 108 is pressed against the first mold 107 (the first mold 107 and the second mold 108 are clamped), the mesh member 103 is interposed between a pressing part 112 of the second mold 108 and the pedestal 111 of the first mold 107, and a cavity 110 is formed for molding an inner cylinder 104 and an outer cylinder 105 on a mold-matching surface 113 side of the first mold 107 and the second mold 108. Then, a melted resin is injected from a gate (not shown) into the cavity 110 to integrally form the resin inner cylinder 104 on an inner circumferential edge of the mesh member 103 and to integrally form the outer cylinder 105 on an outer circumferential edge of the mesh member 103 (see FIG. 10F). Such a technique of insert-molding a mesh filter 100 has been conventionally widely known (see Japanese Unexamined Utility Model Application Publication No. 5-44204 and Japanese Unexamined Patent Application Publication No. 2007-1232).

However, the conventional mesh filter 100 shown in FIGS. 10A to 10D is produced by insert molding, and an additional process for storing the mesh member 103 in a predetermined position in the cavity 110 is needed, thus requiring an increased number of production processes, compared to the case where a whole body is integrally formed by injection molding (see FIG. 10E). Also, in the conventional mesh filter 100 shown in FIGS. 10A to 10D, nylon fibers 106 braided in a grid-like manner are easily displaced and a shape and area (cross-sectional area of a flow path through which a fluid passes) of the openings 102 are easily varied, thus easily causing variation in filter performance (performance of removing a foreign substance of a predefined grain size or more).

Therefore, the applicant of the present application has developed a mesh filter 200 as shown in FIGS. 11A-11G in order to solve the above-described problems of the conventional insert-molded mesh filter 100 (see Japanese Unexamined Patent Application Publication No. 2015-61742). FIG. 11A is a front view of a mesh filter 200, FIG. 11B is a side view of the mesh filter 200, FIG. 11C is a rear view of the mesh filter 200, FIG. 11D is a cross-sectional view of the mesh filter 200 taken along a line A9-A9 of FIG. 11A, FIG. 11E is an enlarged view of a part B5 (a partially enlarged view of a filter part) of FIG. 11A, FIG. 11F is a cross-sectional view taken along a line A10-A10 of FIG. 11E, and FIG. 11G is a cross-sectional view taken along a line A11-A11 of FIG. 11E.

An entire body of the mesh filter 200 shown in FIGS. 11A-11G is integrally formed by injection molding, and a filter part 203 is integrally formed between an inner cylinder 201 and an outer cylinder 202. Also, the filter part 203 is configured to have openings 206 between adjacent horizontal bars 204, 204 and adjacent vertical bars 205, 205 that are perpendicular and adjacent to the horizontal bars 204, 204. Each of the openings 206 is formed in a square shape in planar view.

FIGS. 12A-12D show an injection-molding mold 207 for injection-molding such a conventional mesh filter 200. As shown in FIGS. 12A-12D, in the injection-molding mold 207, a cavity 212 is formed on a side of a mold-matching surface 211 of a first mold 208 and a second mold 210. The cavity 212 includes: a first cavity part 213 for forming the inner cylinder 201 of the mesh filter 200; a second cavity part 214 for forming the outer cylinder 202 of the mesh filter 200; and a third cavity part 215 for forming the filter part 203 of the mesh filter 200. Also, in the third cavity part 215, bar-like opening forming pins 216 of the same number as that of the openings 206 are formed for forming the openings 206. Further, each of the opening forming pin 216 is formed in a thin and long square-bar shape with a square-shaped tip surface 216a and a height L6 from a base end to the tip surface 216a is 0.3 mm same as the thickness L6 of the filter part 203.

In the mesh filter 200 that is injection-molded using the injection-molding mold 207 as such, a plurality of points on the inner cylinder 201 in a circumferential direction and a plurality of points on the outer cylinder 202 in a circumferential direction are pressed by a tip end surface of an ejector pin 217 when the mesh filter is released from the cavity 212 of the injection-molding mold 207. And, a releasing resistance between the opening 206 of the filter part 203 and the opening forming pin 216 of the injection-molding mold 207 tends to increase as the opening forming pin 216 forming the opening 206 of the filter part 203 is thinned. In this case, in the mesh filter 200, the filter part 203 deforms so as to be convex in a direction opposite to an extending direction of the ejector pin 217, and tends to cause a large stress on the thin and long opening forming pin 216 (see FIG. 12D). Therefore, the injection-molding mold 207 of the conventional mesh filter 200 requires highly-skilled labor in operational control during mold-releasing of the mesh filter 200.

Thus, the present invention provides an injection-molding method for a mesh filter, an injection-molding mold, and the mesh filter which can lessen the releasing resistance between the opening of the injection-molded mesh part and the opening forming pin of the injection-molding mold and reduce the stress caused on the opening forming pin.

SUMMARY OF THE INVENTION

The present invention relates to an injection-molding method for a mesh filter 1 molded in a cavity 14 of an injection-molding mold 11. In the present invention, the cavity 14 for forming the mesh filter 1 includes: a first cavity part 15 for forming a cylindrical inner cylinder 2 of the mesh filter 1; a second cavity part 16 for forming a cylindrical outer cylinder 3 of the mesh filter 1 surrounding the inner cylinder 2; and a third cavity part 17 for forming the filter part 4 of the mesh filter 1 connecting an outer circumferential surface 2a of the inner cylinder 2 and an inner circumferential surface 3a of the outer cylinder 3. The third cavity part 17 is formed along an X-Y plane, in which the X-Y plane is an imaginary plane perpendicular to the center axis 18 of the first cavity part 15, and is provided with the opening forming pins 21 for forming the plurality of regular-octagonal openings 6 which are through holes that open in the front and back surfaces of the filter part 4. The opening forming pins 21 stand perpendicularly to the X-Y plane, have a regular-octagonal shape thereof when projected on the X-Y plane, are formed in plurality at regular intervals along X-axis direction on the X-Y plane and formed in plurality at regular intervals along Y-axis direction on the X-Y plane, and are configured such that a diameter of an inscribed circle 22 of the regular-octagonal shape is made equivalent to the dimension between the adjacent opening forming pins 21, 21 along X-axis direction and equivalent to the dimension between the adjacent opening forming pins 21, 21 along Y-axis direction, thereby forming the opening forming pins in plurality at regular intervals along a direction at 45° with respect to the X-axis direction and in plurality at regular intervals along a direction at 135° with respect to the X-axis direction. Also, the interval between a first line and a second line adjacent to the first line of the opening forming pins 21 formed in plurality at regular intervals along the 45°-direction is equivalent to the interval between a third line and a fourth line adjacent to the third line of the opening forming pins 21 formed in plurality at regular intervals along the 135°-direction. In this configuration, the melted resin injected in the first cavity part 15 flows in a gap between the opening forming pins 21, 21 of the third cavity part 17, and then filled in the second cavity part 16.

The present invention relates to an injection-molding mold 11 of the mesh filter 1. In the present invention, the cavity 14 for forming the mesh filter 1 includes: a first cavity part 15 for forming a cylindrical inner cylinder 2 of the mesh filter 1; a second cavity part 16 for forming a cylindrical outer cylinder 3 of the mesh filter 1 surrounding the inner cylinder 2; and a third cavity part 17 for forming the filter part 4 of the mesh filter 1 connecting an outer circumferential surface 2a of the inner cylinder 2 and an inner circumferential surface 3a of the outer cylinder 3. The third cavity part 17 is formed along an X-Y plane, in which the X-Y plane is an imaginary plane perpendicular to the center axis 18 of the first cavity part 15, and is provided with the opening forming pins 21 for forming the plurality of regular-octagonal openings 6 which are through holes that open in the front and back surfaces of the filter part 4. The opening forming pins 21 stand perpendicularly to the X-Y plane, have a regular-octagonal shape thereof when projected on the X-Y plane, are formed in plurality at regular intervals along X-axis direction on the X-Y plane and formed in plurality at regular intervals along Y-axis direction on the X-Y plane, and are configured such that a diameter of an inscribed circle 22 of the regular-octagonal shape is made equivalent to the dimension between the adjacent opening forming pins 21, 21 along X-axis direction and equivalent to the dimension between the adjacent opening forming pins 21, 21 along Y-axis direction, thereby forming the opening forming pins in plurality at regular intervals along a direction at 45° with respect to the X-axis direction and in plurality at regular intervals along a direction at 135° with respect to the X-axis direction. Also, the interval between a first line and a second line adjacent to the first line of the opening forming pins 21 formed in plurality at regular intervals along the 45°-direction is equivalent to the interval between a third line and a fourth line adjacent to the third line of the opening forming pins 21 formed in plurality at regular intervals along the 135°-direction. Further, in the present invention, the gate 20 for injecting the melted resin is arranged in the first cavity part 15 in such a manner that the melted resin injected in the first cavity part 15 flows in a gap between the opening forming pins 21, 21 of the third cavity part 17, and the melted resin flown in the third cavity part 17 is then filled in the second cavity part 16.

The present invention relates to the mesh filter 1 integrally including: a cylindrical inner cylinder 2; a cylindrical outer cylinder 3 surrounding the inner cylinder 2; and a filter part 4 connecting an outer circumferential surface 2a of the inner cylinder 2 and an inner circumferential surface 3a of the outer cylinder 3. The filter part 4 is formed along an X-Y plane, in which the X-Y plane is an imaginary plane perpendicular to the center axis 5 of the inner cylinder 2, and is provided with a plurality of openings 6 having a regular-octagonal opening edge in the X-Y plane and being through holes that open in the front and back surfaces thereof. The openings 6 are formed in plurality at regular intervals along X-axis direction on the X-Y plane and formed in plurality at regular intervals along Y-axis direction on the X-Y plane, and are configured such that a diameter of an inscribed circle 7 of the regular-octagonal shape is made equivalent to the dimension between the adjacent openings 6, 6 along X-axis direction and equivalent to the dimension between the adjacent openings 6, 6 along Y-axis direction, thereby forming the opening forming pins in plurality at regular intervals along a direction at 45° with respect to the X-axis direction and in plurality at regular intervals along a direction at 135° with respect to the X-axis direction. Also, the interval between a first line and a second line adjacent to the first line of the openings 6 formed in plurality at regular intervals along the 45°-direction is equivalent to the interval between a third line and a fourth line adjacent to the third line of the openings 6 formed in plurality at regular intervals along the 135°-direction.

According to the present invention, at the time of releasing the mesh filter after injection molding, the releasing resistance between the openings of filter part of mesh filter and the opening forming pins is smaller than in the case where the shape of the openings of filter part is rectangular. As a result, according to the present invention, the stress caused on the opening forming pins of the injection-molding mold can be reduced, which can improve durability of the injection-molding mold and facilitate an operational control of the injection-molding mold at the time of releasing the mesh filter.

BRIEF DESCRIPTION OF THE DRAWINGS

FIGS. 1A-1D show a mesh filter according to the first embodiment of the present invention. FIG. 1A is a front view of the mesh filter, FIG. 1B is a side view of the mesh filter, FIG. 1C is a rear view of the mesh filter, and FIG. 1D is a cross-sectional view of the mesh filter taken along a line A1-A1 of FIG. 1A.

FIGS. 2A-2C show a mesh filter according to the first embodiment of the present invention. FIG. 2A is an enlarged view of a part B1 of FIG. 1A (a partially enlarged view of the mesh filter), FIG. 2B is a cross-sectional view taken along a line A2-A2 of FIG. 2A (a partially enlarged cross-sectional view of the mesh filter), and FIG. 2C is a cross-sectional view taken along a line A3-A3 of FIG. 2A (a partially enlarged cross-sectional view of the mesh filter).

FIG. 3A is an enlarged view of a regular-octagonal opening according to the present embodiment, and FIG. 3B is an enlarged view of a square opening according to the conventional example.

FIG. 4A is a vertical cross-sectional view of the injection-molding mold, FIG. 4B is an enlarged view of a part B2 of FIG. 4A, FIG. 4C shows a first variation of a protrusion for forming an opening (corresponding to FIG. 4B), and FIG. 4D shows a second variation of a protrusion for forming an opening (corresponding to FIG. 4D).

FIGS. 5A-5C show an injection-molding mold used for an injection molding of a mesh filter according to the first embodiment of the present invention. FIG. 5A is a partially enlarged plan view of a second mold viewed from F1 direction of FIG. 4B, FIG. 5B is a cross-sectional view of the second mold taken along a line A4-A4 of FIG. 5A, and FIG. 5C is a cross-sectional view of the second mold taken along a line A5-A5 of FIG. 5A.

FIGS. 6A-6D show a mesh filter according to the second embodiment of the present invention. FIG. 6A is a front view of the mesh filter, FIG. 6B is a side view of the mesh filter, FIG. 6C is a rear view of the mesh filter, and FIG. 6D is a cross-sectional view of the mesh filter taken along a line A6-A6 of FIG. 6A.

FIGS. 8A-8D show a mesh filter according to the third embodiment of the present invention. FIG. 8A is a front view of the mesh filter, FIG. 8B is a side view of the mesh filter, FIG. 8C is a rear view of the mesh filter, and FIG. 8D is a cross-sectional view of the mesh filter taken along a line A7-A7 of FIG. 8A.

FIG. 9A is a cross-sectional view of the injection-molding mold, FIG. 9B is an enlarged view of a part B2 of FIG. 9A, FIG. 9C shows a first variation of an opening forming pin for forming an opening, and FIG. 9D shows a second variation of an opening forming pin for forming an opening.

FIGS. 10A-10F show a mesh filter according to first conventional example. FIG. 10A is a front view of the mesh filter, FIG. 10B is a side view of the mesh filter, FIG. 10C is a cross-sectional view of the mesh filter taken along a line A8-A8 of FIG. 10A, FIG. 10D is an enlarged view of a part B4 of FIG. 10A, FIG. 10E is a cross-sectional view of an injection-molding mold for illustrating a first stage in a forming method of the mesh filter, and FIG. 10F is a cross-sectional view of the injection-molding mold for illustrating a second stage in the forming method of the mesh filter.

FIG. 11A is a front view of the mesh filter, FIG. 11B is a side view of the mesh filter, FIG. 11C is a rear view of the mesh filter, FIG. 11D is a cross-sectional view of the mesh filter taken along line A9-A9 of FIG. 11A, FIG. 11E is an enlarged view of a part B5 (a partially enlarged view of a filter part) of FIG. 11A, FIG. 11F is a cross-sectional view taken along a line A10-A10 of FIG. 11E, and FIG. 11G is a cross-sectional view taken along a line A11-A11 of FIG. 11E.

FIG. 12A is a cross-sectional view of the injection-molding mold, FIG. 12B is an enlarged view of a part B6 of FIG. 12A, FIG. 12C is a partially enlarged plan view of a second mold viewed from F3 direction of FIG. 12B, and FIG. 12D is a simplified view of a deformation state during mold-release of the mesh filter.

DETAILED DESCRIPTION OF THE PREFERRED EMBODIMENTS

Figure 3A:
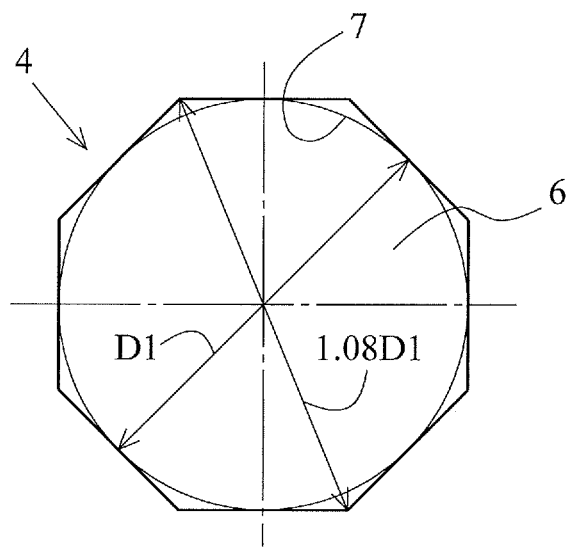
FIGS. 3A and 3B show a comparison between a regular-octagonal opening of a filter part according to the first embodiment of the present invention and a square opening of a filter part according to the conventional example.

In the following, embodiments of the present invention are described in detail by reference to drawings.

First Embodiment

FIGS. 1A-1D and 2A-2C show a mesh filter 1 according to the first embodiment of the present invention. FIG. 1A is a front view of a mesh filter 1, FIG. 1B is a side view of the mesh filter 1, FIG. 1C is a rear view of the mesh filter 1, and FIG. 1D is a cross-sectional view of the mesh filter1 taken along a line A1-A1 of FIG. 1A. Also, FIG. 2A is an enlarged view of a part B1 of FIG. 1A (a partially enlarged view of the mesh filter 1), FIG. 2B is a cross-sectional view taken along a line A2-A2 of FIG. 2A (a partially enlarged cross-sectional view of the mesh filter 1), and FIG. 2C is a cross-sectional view taken along a line A3-A3 of FIG. 2A (a partially enlarged cross-sectional view of the mesh filter 1).

As shown in these figures, the mesh filter 1 integrally includes: a cylindrical inner cylinder 2 (an inner frame); a cylindrical outer cylinder 3 concentric with the inner cylinder 2 (an outer frame surrounding the inner frame), and a filter part 4 connecting an outer circumferential surface 2a of the inner cylinder 2 and an inner circumferential surface 3a of the outer cylinder 3 along a radial direction. Also, an entire body of the mesh filter 1 is integrally formed of synthetic resin material (for example, nylon-6,6, polyacetal (POM), polyphenylene sulfide (PPS)). Such a mesh filter 1 is provided, for example, to a fuel supply pipe connected to a fuel injection device of an automobile, and the inner cylinder 2 and the outer cylinder 3 are installed to the fuel supply pipe or the like via a seal member (not shown) so as to avoid, during use, a leakage of the fuel (fluid) passing through the filter part 4.

The mesh filter is formed such that, for example, an outer diameter of the inner cylinder 2 is 10 mm, an outer diameter of the outer cylinder 3 is 16 mm, a thickness of the inner cylinder 2 is 1 mm, and a thickness of the outer cylinder 3 is 1 mm. It is to be noted that the values related to the inner cylinder 2 and the outer cylinder 3 are shown as examples for ease of understanding of the mesh filter according to the present embodiment, and can be appropriately changed depending on the condition of use and the like.

The inner cylinder 2 and the outer cylinder 3 have the same length L1 along a center axis 5, in which one end surfaces 2b, 3b in a direction along the center axis 5 are both located on the same imaginary plane perpendicular to the center axis 5, and the other end surfaces 2c, 3c in a direction along the center axis 5 are both located on the same imaginary plane perpendicular to the center axis 5. It is to be noted that the relationship between the inner cylinder 2 and the outer cylinder 3 is not limited to the present embodiment but can be modified according to an installation state of the mesh filter 1 and can have different dimensions in a direction along the center axis 5 of the inner cylinder 2 and the outer cylinder 3, and also the one end surface 2b in the direction along the center axis 5 of the inner cylinder 2 may be configured so as to be displaced from the one end surface 3b in the direction along the center axis 5 of the outer cylinder 3. Also, the other end surface 2c in the direction along the center axis 5 of the inner cylinder 2 may be configured so as to be displaced from the other end surface 3c in the direction along the center axis 5 of the outer cylinder 3.

The filter part 4 is formed along an X-Y plane, in which the X-Y plane is an imaginary plane perpendicular to the direction along the center axis 5 of the inner cylinder 2. Also, the filter part 4 is provided with a plurality of openings 6 having a regular-octagonal opening edge in the X-Y plane and being through holes that open in the front and back surfaces thereof. The openings 6 are formed in plurality at regular intervals along X-axis direction on the X-Y plane and formed in plurality at regular intervals along Y-axis direction on the X-Y plane, and are configured such that a diameter D1 of an inscribed circle of the regular-octagonal shape is made equivalent to the dimension L2 between the adjacent openings 6, 6 along X-axis direction and equivalent to the dimension L3 between the adjacent openings 6, 6 along Y-axis direction, thereby forming the opening forming pins in plurality at regular intervals along a direction at 45° with respect to the X-axis direction and in plurality at regular intervals along a direction at 135° with respect to the X-axis direction. Also, the interval L4 between a first line and a second line adjacent to the first line of the openings 6 formed in plurality at regular intervals along the 45°-direction is equivalent to the interval L5 between a third line and a fourth line adjacent to the third line of the openings 6 formed in plurality at regular intervals along the 135°-direction. It is to be noted that the filter part 4 is configured to connect center portions in a direction along the center axis 5 of the inner cylinder 2 and the outer cylinder 3 in a radial direction, but not limited to this, the filter part 4 may be positioned closer to one end in the direction along the center axis 5 of the inner cylinder 2 and the outer cylinder 3 or closer to the other end in the direction along the center axis 5 of the inner cylinder 2 and the outer cylinder 3.

For example, in the filter part 4, the diameter of the inscribed circle 7 of the regular-octagonal opening 6 is 0.1 mm, the dimension L2 between the adjacent openings 6, 6 along the X-axis direction is 0.1 mm, the dimension L3 between the adjacent openings 6, 6 along the Y-axis direction is 0.1 mm, the interval L4 between a first line and a second line adjacent to the first line of the openings 6 formed in plurality at regular intervals along the 45°-direction is 0.04 mm, and the interval L5 between a third line and a fourth line adjacent to the third line of the openings 6 formed in plurality at regular intervals along the 135°-direction is 0.04 mm. Also, the thickness L6 (the dimension along the Z-axis direction) of the filter part 4 is 0.3 mm. It is to be noted that the values related to the filter part 4 are shown as examples for ease of understanding of the mesh filter 1 according to the present embodiment, and can be appropriately changed depending on the condition of use and the like.

Figure 3B:
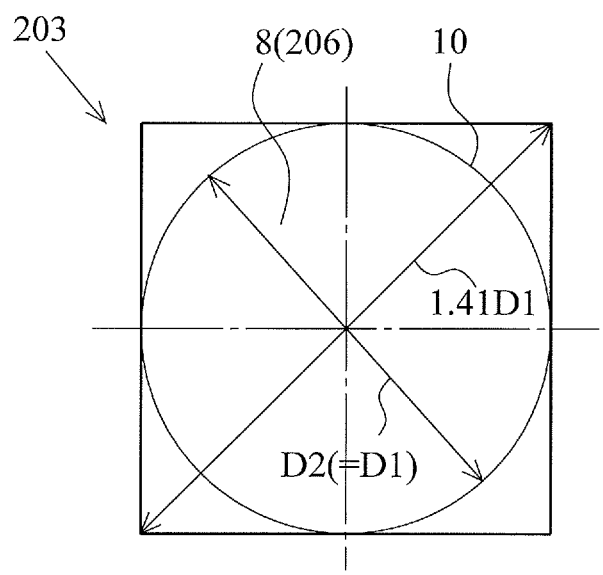

FIGS. 3A and 3B show a comparison between a regular-octagonal opening 6 of a filter part 4 according to the present embodiment and a square opening 8(206) of a filter part 203 according to the conventional example. FIG. 3A is an enlarged view of a regular-octagonal opening 6 according to the present embodiment, and FIG. 3B is an enlarged view of a square opening 8(206) according to the conventional example.

As shown in FIGS. 3A and 3B, in the case where the diameter D1 of the inscribed circle 7 of the regular-octagonal opening 6 and the diameter D2 of the inscribed circle 10 of the square opening 8(206) are equivalent (D1=D2), a variance of a length of foreign substances to be filtered out by the regular-octagonal opening 6 is 1 to 1.08, while those by the square opening 8(206) is 1 to 1.41. Thus, the regular-octagonal opening 6 shows smaller variance in the length of foreign substances to be filtered out compared to that of the square opening 8(206), and therefore shows better filtering property of foreign substances.

Figure 4A:
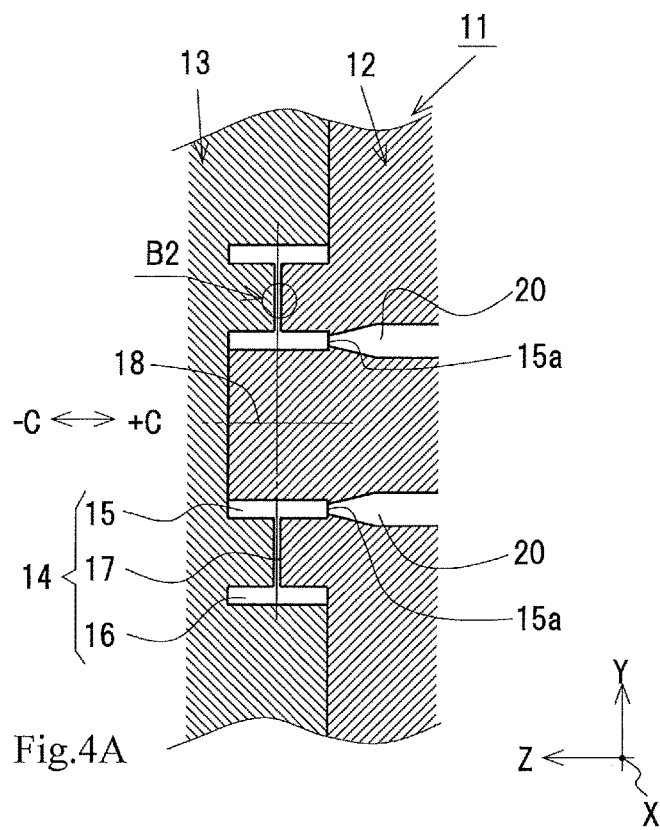
FIGS. 4A-4D show an injection-molding mold used for an injection molding of a mesh filter according to the first embodiment of the present invention.
Figure 4B:
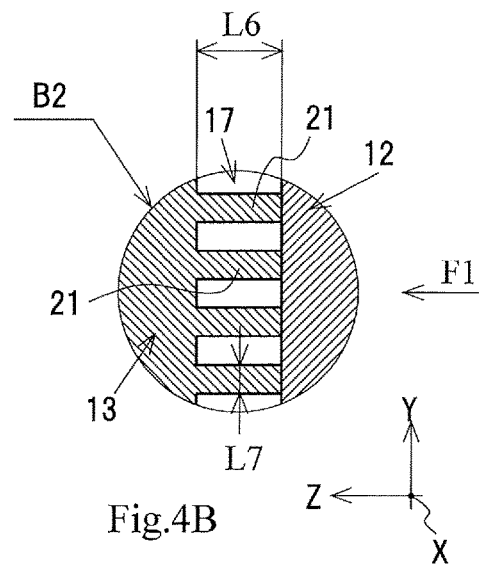

FIGS. 4A-4D and 5A-5C show an injection-molding mold 11 of the mesh filter 1 according to the present embodiment. In this FIGS. 4A-4D, FIG. 4A is a vertical cross-sectional view of the injection-molding mold 11, and FIG. 4B is an enlarged view of a part B2 of FIG. 4A (a partially enlarged cross-sectional view of the injection-molding mold 11). Also, FIG. 5A is a partially enlarged plan view of a second mold 13 viewed from F1 direction of FIG. 4B, FIG. 5B is a cross-sectional view of the second mold 13 taken along a line A4-A4 of FIG. 5A, and FIG. 5C is a cross-sectional view of the second mold 13 taken along a line A5-A5 of FIG. 5A.

As shown in FIG. 4A, in the injection-molding mold 11, a cavity 14 for injection-molding the mesh filter 1 is formed on a side of a mold-matching surface of a first mold 12 and a second mold 13. The cavity 14 includes: a cylindrical first cavity part 15 for forming the inner cylinder 2 of the mesh filter 1; a cylindrical second cavity part 16 for forming the outer cylinder 3 of the mesh filter 1; and a hollow disk-like third cavity part 17 for forming the filter part 4 of the mesh filter 1. Also, in the first mold 12, six gates 20, being opened to the one end surface 15a side in a direction along the center axis 18 of the first cavity part 15, are installed at regular intervals along a circumferential direction of the first cavity part 15 (see gate marks 20a in FIG. 1C).

The third cavity part 17 of the second mold 13 is formed along an X-Y plane, in which the X-Y plane is an imaginary plane perpendicular to the center axis 18 of the first cavity part 15, and is provided with the opening forming pins 21 of the same number as that of the openings 6 for forming the plurality of regular-octagonal openings 6 which are through holes that open in the front and back surfaces of the filter part 4 (see FIG. 4B, FIGS. 5A-5C). The opening forming pins 21 formed in the third cavity part 17 stand perpendicularly to the X-Y plane, have a regular-octagonal shape thereof when projected on the X-Y plane (the shape in planar view), and are formed in plurality at regular intervals along X-axis direction on the X-Y plane and formed in plurality at regular intervals along Y-axis direction on the X-Y plane. The opening forming pins 21 are configured such that a diameter D1 of an inscribed circle 22 of the regular-octagonal shape is made equivalent to the dimension L2 between the adjacent opening forming pins 21, 21 along X-axis direction and equivalent to the dimension L3 between the adjacent opening forming pins 21, 21 along Y-axis direction, thereby forming the opening forming pins in plurality at regular intervals along a direction at 45° with respect to the X-axis direction and in plurality at regular intervals along a direction at 135° with respect to the X-axis direction. Also, the interval L4 between a first line and a second line adjacent to the first line of the opening forming pins 21 formed in plurality at regular intervals along the 45°-direction is equivalent to the interval L5 between a third line and a fourth line adjacent to the third line of the opening forming pins 21 formed in plurality at regular intervals along the 135°-direction. Further, in the opening forming pins 21, the height dimension L6 thereof (the dimension L6 along the Z-axis direction in FIG. 4B, FIG. 5B to C) is formed to correspond to the thickness dimension L6 of the filter part 4. While the present embodiment shows an aspect where the gates 20 opening in the cavity 14 are provided at six positions at regular intervals along a circumferential direction of the first cavity part 15 as an example, the gates 20 may be provided, without limitation, at two or more positions according to an outer diameter dimension of the first cavity part 15 or the like. Also, a ring gate may be provided instead of the plurality of the gates 20.

The opening forming pins 21 of the third cavity part 17 having such a configuration is formed using two types of processing tools. That is, in the third cavity part 17 of the injection-molding mold 11, a plurality of horizontal grooves 23 parallel with the X-axis are formed at regular intervals by using a first processing tool (not shown), and a plurality of vertical grooves 24 parallel with the Y-axis are formed at regular intervals by using the first processing tool. Then, in the third cavity part 17 of the injection-molding mold 11, a plurality of first diagonal grooves 25 extending in a direction at 45° with respect to the X-axis are formed at regular intervals by using a second processing tool (not shown), and a plurality of second diagonal grooves 26 extending in a direction at 135° with respect to the X-axis (a direction perpendicular to the first diagonal grooves 25) are formed at regular intervals by using the second processing tool. Thus, the opening forming pins 21 of the third cavity part 17 is easily formed by transferring the first processing tool along the X-axis direction, transferring the first processing tool along the Y-axis direction, transferring the second processing tool along the direction at 45° with respect to the X-axis direction, and transferring the second processing tool along the direction at 135° with respect to the X-axis direction. For example, the horizontal grooves 23 and the vertical grooves 24 are formed using the first processing tool so as to have 0.1 mm of groove width (L2, L3) and 0.3 mm of groove depth (L6). Also, the first diagonal groove 25 and the second diagonal groove 26 are formed using the second processing tool so as to have 0.04 mm of groove width (L4, L5) and 0.3 mm of groove depth (L6). Here, transferring the first processing tool in the X-axis direction and Y-axis direction involves transferring (moving) a table on which the injection-molding mold 11 is fixed against the first processing tool along the X-axis direction and Y-axis direction. Also, transferring the second processing tool in the direction at 45° and in the direction at 135° with respect to the X-axis direction involves transferring (moving) a table on which the injection-molding mold 11 is fixed against the second processing tool while being rotated at 45° and 135° with respect to the X-axis direction.

Figure 12A:
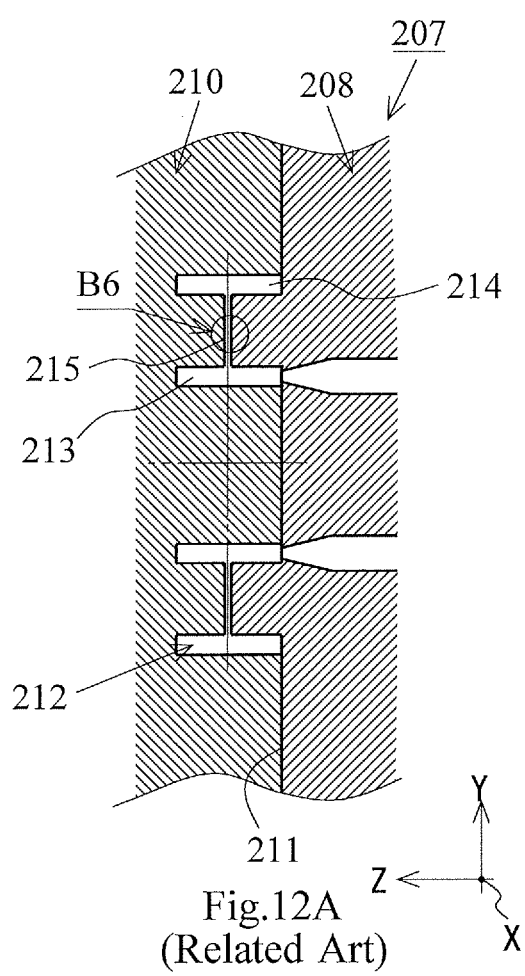
FIGS. 12A-12D show an injection-molding mold used for an injection molding of a mesh filter according to second conventional example.
Figure 12B:
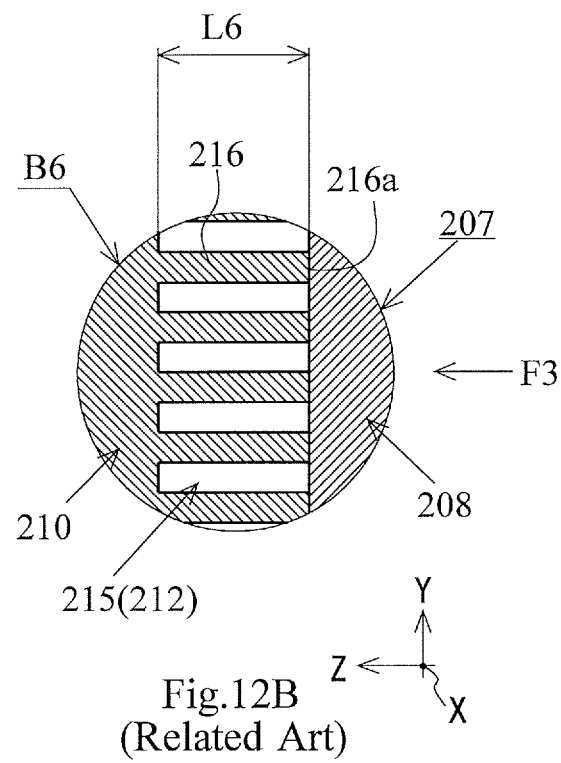
Figure 12C:
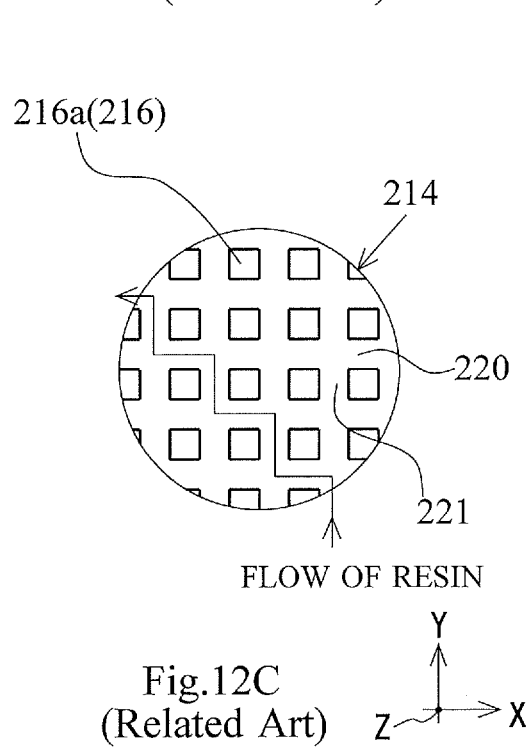
Figure 12D:
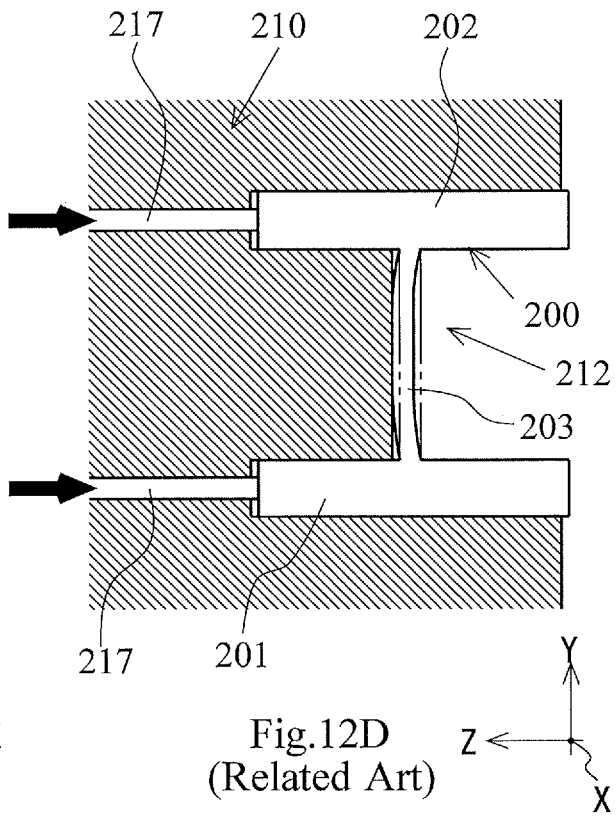

In the injection-molding mold 11 having such a structure, as shown in FIG. 4A, while the first mold 12 and the second mold 13 are mold-clamped, the melted synthetic resin material is injected into the first cavity 15 from the plurality of gates 20. The synthetic resin material in a melted state injected in the first cavity part 15 is filled in the first cavity part 15, and then flows in a radial manner from the first cavity part 15 into the third cavity part 17. The synthetic resin material in a melted state flown in the third cavity part 17 flows in a gap between the opening forming pins 21, 21 to fill the third cavity part 17. Here, as shown in FIGS. 5A-5C, the synthetic resin material in a melted state in the third cavity part 17 flows rapidly in directions along the horizontal groove 23, vertical groove 24, the first diagonal groove 25, and the second diagonal groove 26. Meanwhile, as shown in FIG. 12C, in the third cavity part 215 of the conventional injection-molding mold 207 in which a cross-sectional shape of the opening forming pins 216 is rectangular, though the synthetic resin material in a melted state flows rapidly in directions along the horizontal groove 220 and the vertical groove 221, no grooves corresponding to the first diagonal groove 25 and the second diagonal groove 26 as in the third cavity part 17 of the injection-molding mold 11 according to the present embodiment are formed, and thus the synthetic resin material in a melted state flows between the opening forming pins 216 in a diagonal direction in a zigzag manner. As a result, in the injection-molding mold 11 according to the present embodiment as shown in FIGS. 4A-4D and 5A-5C, a flowing distance of the melted resin in the third cavity part 17 is shortened and a filling speed of the synthetic resin material in a melted state into the third cavity part 17 is accelerated compared to the conventional injection-molding mold 207 as shown in FIGS. 12A-12D, which prevents a short shot and allows an injection molding of the mesh filter 1 having a larger filter part 4 in area.

Next, the synthetic resin material in a melted state filled in the third cavity part 17 flows into the second cavity part 16 to fill the second cavity part 16. Then, the injection-molding mold 11 in which the synthetic resin material in a melted state is filled entirely in the cavity 14 is cooled with a pressure in the cavity 14 being maintained at a predetermined pressure. Then, the second mold 13 is released (mold-opened) from the first mold 12 in a −C direction, and the mesh filter 1 in the cavity 14 is pushed out from the cavity 14 by an ejector pin (not shown) to take out the injection-molded mesh filter 1 from the injection-molding mold 11 (see FIGS. 1A-1D). Here, compared to the conventional injection-molding mold 206 as shown in FIGS. 12A-12D, the injection-molding mold 11 according to the present embodiment shows smaller releasing resistance between the opening forming pins 21 and the openings 6 of the mesh filter 1, which reduces the stress caused on the opening forming pins 1 and thus improves durability.

Then, in the injection-molding mold 11 according to the present embodiment, the second mold 13 in a mold-opened state is moved in a +C direction (a direction moving closer to the first mold 12), where the second mold 13 is pressed against the first mold 12 so that the first mold 12 and the second mold 13 are mold-clamped, thereby completing one cycle of an injection molding of the mesh filter 1.

Figure 4C:
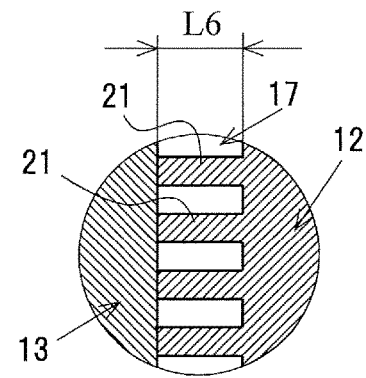

FIG. 4C shows a first variation of the opening forming pins 21 for forming the openings 6 of the filter part 4. As shown in FIG. 4C, the opening forming pins 21 for forming the openings 6 of the filter part 4 may be formed not in a region for forming the third cavity part 17 of the second mold 13 but may be formed only in a region for forming the third cavity part 17 of the first mold 12.

Figure 4D:
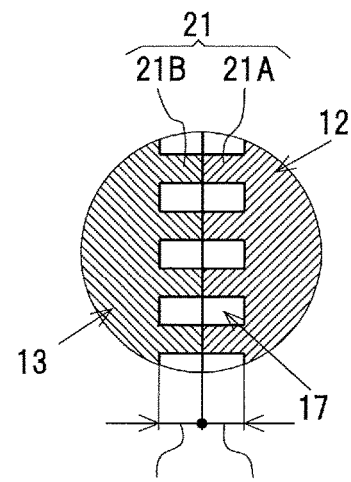

FIG. 4D shows a second variation of the opening forming pins 21 for forming the openings 6 of the filter part 4. As shown in FIG. 4D, the opening forming pins 21 for forming the openings 6 of the filter part 4 may be formed to have a portion for forming the third cavity part 17 of the first mold 12 and a portion for forming the third cavity part 17 of the second mold 13 separately therefrom. In this second variation, the height dimension of respective opening forming pins 21A, 21B in the first mold 12 and the second mold 13 are made to have a half of the height dimension L6 (L6/2) of the opening forming pins 21 according to the above embodiment and the first variation. Also, at the time of mold-clamping of the first mold 12 and the second mold 13, a top surface of the opening forming pin 21A and a top surface of the opening forming pin 21B are matched to each other.

In the present embodiment, at the time of releasing the mesh filter 1 after injection molding, the releasing resistance between the regular-octagonal openings 6 of filter part 4 of mesh filter 1 and the opening forming pins 21 is smaller than in the case where the shape of the openings 6 of filter part 4 is rectangular. As a result, according to the present embodiment, the stress caused on the opening forming pins 21 of the injection-molding mold 11 can be reduced, which can improve durability of the injection-molding mold 11 and facilitate an operational control of the injection-molding mold at the time of releasing the mesh filter.

Also, in the mesh filter 1 according to the present embodiment, since the shape of the openings 6 of the filter part 4 is regular-octagonal, a variance in the size of foreign substances to be filtered out is smaller compared to the conventional example in which the shape of the openings 6 of the filter part 4 is square, and therefore better filtering property is obtained.

Further, in the injection-molding mold 11 according to the present embodiment, the synthetic resin material in a melted state in the third cavity part 17 for forming the filter part 4 flows rapidly in directions along the horizontal groove 23, vertical groove 24, the first diagonal groove 25, and the second diagonal groove 26 (see FIGS. 5A-5C), a flowing distance of the melted resin in the third cavity part 17 is shortened compared to the conventional injection-molding mold 207 as shown in FIGS. 12A-12D. As a result, in the injection-molding mold 11 according to the present embodiment, a filling speed of the synthetic resin material in a melted state into the third cavity part 17 is accelerated compared to the conventional injection-molding mold 207 as shown in FIGS. 12A-12D, which prevents a short shot and allows an injection molding of the mesh filter 1 having a larger filter part 4 in area.

Also, in the third cavity part 17 of the injection-molding mold 11 according to the present embodiment, a plurality of horizontal grooves 23 parallel with the X-axis are formed at regular intervals by using a first processing tool, a plurality of vertical grooves 24 parallel with the Y-axis are formed at regular intervals by using the first processing tool, a plurality of first diagonal grooves 25 extending in a direction at 45° with respect to the X-axis are formed at regular intervals by using a second processing tool, and a plurality of second diagonal grooves 26 extending in a direction at 135° with respect to the X-axis (a direction perpendicular to the first diagonal grooves 25) are formed at regular intervals by using a second processing tool. As a result, in the injection-molding mold 11 according to the present embodiment, the regular-octagonal opening forming pins 21 of the third cavity part 17 are easily formed by transferring the first processing tool along the X-axis direction, transferring the first processing tool along the Y-axis direction, transferring the second processing tool along the direction at 45° with respect to the X-axis direction, and transferring the second processing tool along the direction at 135° with respect to the X-axis direction.

Second Embodiment

FIGS. 6A-6D show a mesh filter 1 according to the second embodiment of the present invention. In the mesh filter 1 according to the present embodiment as shown in FIG. 6A-6D, the same reference numbers are used to represent the same parts in the mesh filter 1 according to the first embodiment, and any explanations redundant with that of the mesh filter 1 according to the first embodiment are omitted. FIG. 6A is a front view of a mesh filter 1, FIG. 6B is a side view of the mesh filter 1, FIG. 6C is a rear view of the mesh filter 1, and FIG. 6D is a cross-sectional view of the mesh filter 1 taken along a line A6-A6 of FIG. 6A.

In the mesh filter 1 according to the present embodiment, an inner filter part 27 is formed on a radially inward side of the inner cylinder 2 from a center axis 5 of the inner cylinder 2 to an inner circumferential surface 2d of the inner cylinder 2. The inner filter part 27 is formed in the same manner as the filter part 4 of the mesh filter 1 according to the first embodiment (see FIG. 2A and FIG. 3A). Here, an enlarged view of a part B1 in the filter part 4 of the mesh filter 1 shown in FIG. 6A corresponds to FIG. 2A. Also, an enlarged view of a part B3 in the inner filter part 27 of the mesh filter 1 shown in FIG. 6A corresponds to FIG. 2A. It is to be noted that, in the mesh filter 1 according to the present embodiment, when a grain size of foreign substances to be filtered out by the inner filter part 27 is different from a grain size of foreign substances to be filtered out by the filter part 4, an opening area of the opening 6 (inner opening) of the inner filter part 27 may be different from that of the opening 6 of the filter part 4 depending on a grain side of foreign substances to be filtered out.

Figure 7:
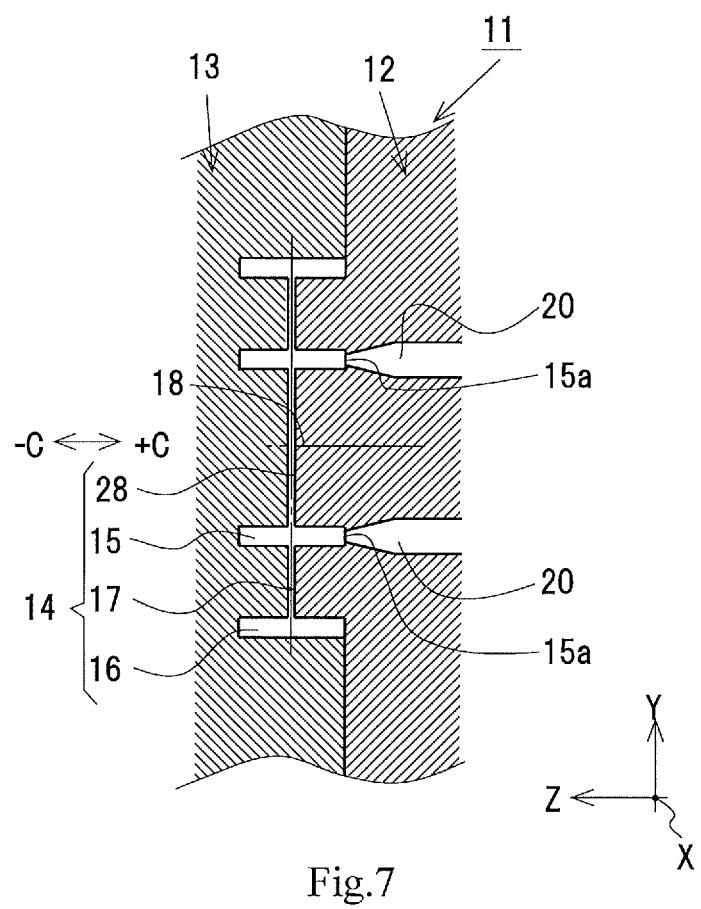
FIG. 7 shows an injection-molding mold used for an injection molding of a mesh filter according to the second embodiment of the present invention, and is a cross-sectional view corresponding to FIG. 4A.

FIG. 7 shows an injection-molding mold 11 used for an injection molding of a mesh filter 1 according to the present embodiment, which is a cross-sectional view corresponding to FIG. 4A. It is to be noted that, in the injection-molding mold 11 shown in FIG. 7, the same reference numbers are used to represent the same parts in the injection-molding mold 11 in FIG. 4A, and any explanations overlapped with that of the injection-molding mold 11 in FIG. 4A are omitted.

In the injection-molding mold 11 shown in FIG. 7, a fourth cavity part 28 for forming the inner filter part 27 is formed on a radially inward side of the first cavity part 15 for forming the cylindrical inner cylinder 2. Also, in the same manner as the opening forming pins 21 for forming the openings 6 of the filter part 4 as shown in FIGS. 5A-5C, a plurality of opening forming pins (inner opening forming pins) 21 for forming the openings 6 of the inner filter part 27 are formed in the fourth cavity part 28.

In the injection-molding mold 11 according to the present embodiment, when the synthetic resin material in a melted state is injected from the gate 20 that opens to the first cavity part 15, the synthetic resin material in a melted state flows from the first cavity part 15 into the third cavity part 17 and the fourth cavity part 28 to integrally and highly-accurately injection-mold a whole body (cylindrical inner cylinder 2, cylindrical outer cylinder 3, filter part 4, and inner filter part 27).

Third Embodiment

FIGS. 8A-8D show a mesh filter 1 according to the third embodiment of the present invention. FIG. 8A is a front view of a mesh filter 1, FIG. 8B is a side view of the mesh filter 1, FIG. 8C is a rear view of the mesh filter 1, and FIG. 8D is a cross-sectional view of the mesh filter 1 taken along a line A7-A7 of FIG. 8A.

As shown in FIGS. 8A-8D, the mesh filter 1 integrally includes: a disk-like or solid round bar-like center part 30; a cylindrical outer cylinder 3 (outer frame) concentric with a center axis 5 of the center part 30 and positioned so as to surround the center part 30; and a filer part 4 connecting an outer circumferential surface 30a of the center part 30 and an inner circumferential surface 3a of the outer cylinder 3 in a radial direction. In the mesh filter 1 according to the present embodiment, the filter part 4 is configured in the same manner as the filter part 4 of the mesh filter 1 according to the first embodiment, except that the center part 30 is replaced with the inner cylinder 2 of the mesh filter 1 according to the first embodiment and the shape of the outer cylinder 3 is different from that of the outer cylinder 3 of the mesh filter 1 according to the first embodiment.

The center part 30 includes a gate 31 for injection molding opening thereto, and has an outer diameter dimension of the size the same as or larger than an inner diameter dimension of the opening of the gate 31 (see gate marks 31a in FIG. 8C, and FIGS. 9A-9D). This center part 30 is cut off from the gate 31 for injection molding upon completion of the injection molding and before taking out the injection-molded mesh filter 1 from the injection-molding mold 11, and thus the center part 30 is configured to have a thickness dimension that is not damaged by the force caused at the time of cutting off the gate 31 (see FIGS. 9A-9D). A surface 30b of the center part 30 projects from a surface 4a of the filter part 4 in a direction along the center axis 5 (+Z-axis direction). Also, a back surface 30c of the center part 30 projects from a back surface 4b of the filter part 4 in a direction along the center axis 5 (−Z-axis direction).

In the outer cylinder 3, one end surface 3b projects from the surface 30b of the center part 30 in a direction along the center axis 5 (+Z-axis direction), while the other end surface 3c projects from the back surface 30c of the center part 30 in a direction along the center axis 5 (−Z-axis direction). Also, the outer cylinder 3 contains the filter part 4 and the center part 30 on a radial inward side thereof. It is to be noted that the shape of the outer cylinder 3 is optionally changed (for example, changed to a width-across flats shape or a hexagonal shape) depending on a structure of an installment member (for example, a supply pipe channel of oil for controlling a hydraulic control device) to which the mesh filter 1 is installed.

The filter part 4 is formed along an X-Y plane, in which the X-Y plane is an imaginary plane perpendicular to the direction along the center axis 5 of the center part 30, and the part B1 in FIG. 8A is formed in the same manner as the part B1 in FIG. 1A. As shown in FIGS. 2A-2C (in the same manner as the filter part 4 of the mesh filter 1 according to the first embodiment), the filter part 4 is provided with a plurality of regular-octagonal openings 6.

It is to be noted that, while the mesh filter 1 in FIG. 8B is formed right-left symmetric with respect to a center line 32 in a width direction of the outer cylinder 3, the filter part 4 and the center part 30 may be displaced in a direction along the center axis 5 with respect to the center line 32 in a width direction (+Z-axis direction or −Z-axis direction). Also, in the mesh filter 1 in FIG. 8B, either the filter part 4 or the center part 3 may be displaced in a direction along the center axis 5 with respect to the center line 32 in a width direction of the outer cylinder 3 (+Z-axis direction or −Z-axis direction).

Figure 9A:
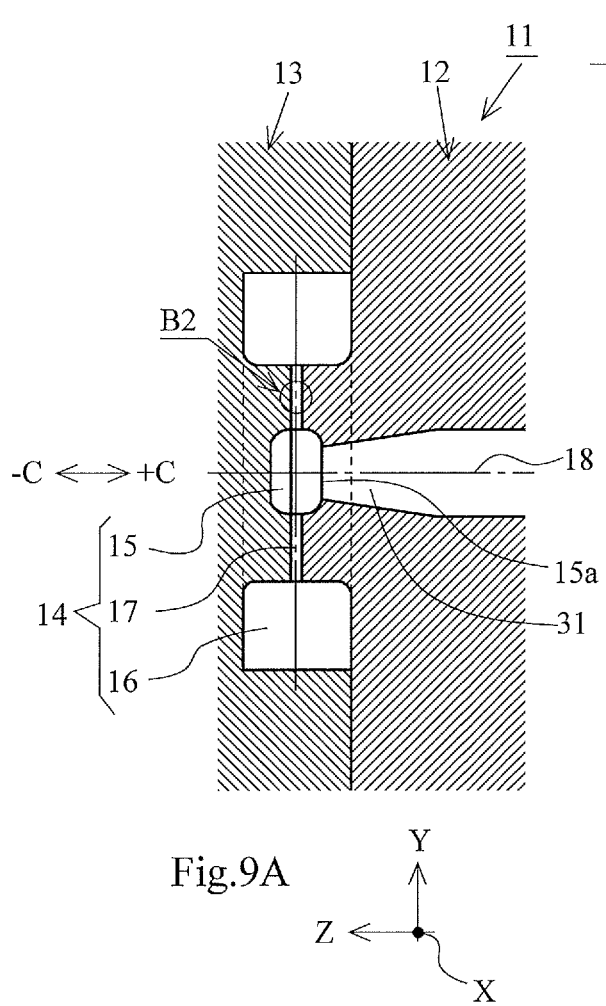
FIGS. 9A-9D show an injection-molding mold used for an injection molding of a mesh filter according to the third embodiment of the present invention.
Figure 9B:
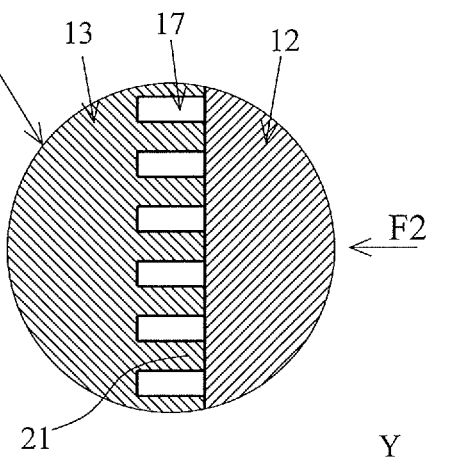

FIGS. 9A-9D show an injection-molding mold 11 used for an injection molding of the mesh filter 1 according to the present embodiment. FIG. 9A is a cross-sectional view of the injection-molding mold 11 corresponding to FIG. 4A. Also, FIG. 9B is an enlarged view of a part B2 of FIG. 9A corresponding to FIG. 4B.

As shown in FIGS. 9A-9D, in the injection-molding mold 11, a cavity 14 for injection-molding the mesh filter 1 is formed on a side of a mold-matching surface of a first mold 12 and a second mold 13. The cavity 14 includes: a disk-like first cavity part 15 for forming a center part 30 of the mesh filter 1; a cylindrical second cavity part 16 for forming the outer cylinder 3 of the mesh filter 1; and a hollow disk-like third cavity part 17 for forming the filter part 4 of the mesh filter 1. Also, the first mold 12 includes a gate 31 being opened to the one end surface 15a side in a direction along the center axis 18 of the first cavity part 15 at one position at a center of the first cavity part 15 (see a gate mark 31a in FIG. 8C). Also, in a part for forming the third cavity part 17 of the second mold 13, a plurality of opening forming pins 21 (of the same number as that of the openings 6) are formed for forming the regular-octagonal openings 6 (see FIG. 5). In the same manner as the opening forming pins 21 of the injection-molding mold 11 according to the first embodiment as shown in FIGS. 5A-5C, the opening forming pins 21 has a regular-octagonal shape in planar view (the shape viewed from F2 direction in FIG. 9B), and is formed in a dimension which can form the regular-octagonal openings 6. In the present embodiment, as shown in FIGS. 5A-5C, the third cavity part 17 is formed in the same manner as the third cavity part 17 of the injection-molding mold 11 according to the first embodiment, and the opening forming pins 21 are formed in the same manner as the opening forming pins 21 of the injection-molding mold 11 according to the first embodiment. While the present embodiment shows an aspect where the gate 31 opening in the cavity 14 is provided at one position at a center of the first cavity part 15 as an example, the gates 20 may be provided, without limitation, at two or more positions depending on an outer diameter dimension of the first cavity part 15 or the like.

In the injection-molding mold 11 having such a structure, as shown in FIG. 9A, the resin in a melted state is injected into the cavity 14 from the gate 31 while the first mold 12 and the second mold 13 are mold-clamped, and then the injection-molding mold is cooled down with a pressure in the cavity 14 being maintained at a predetermined pressure. Then, the gate 31 is cut off from the injection-molded product (mesh filter 1) in the cavity 14, the second mold 13 is released (mold-opened) from the first mold 12 in a −C direction, and the mesh filter 1 in the cavity 14 is pushed out from the cavity 14 by an ejector pin (not shown) to take out the injection-molded mesh filter 1 from the injection-molding mold 11 (see FIGS. 8A-8D). Then, in the injection-molding mold 11, the second mold 13 in a mold-opened state is moved in a +C direction (a direction moving closer to the first mold 12), where the second mold 13 is pressed against the first mold 12 so that the first mold 12 and the second mold 13 are mold-clamped.

Figure 9C:
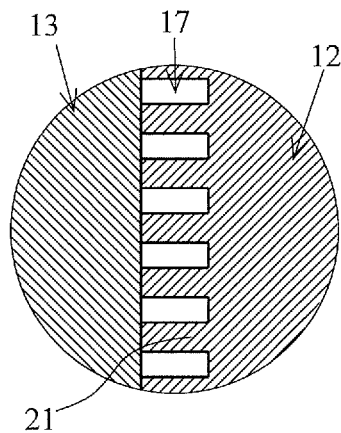

FIG. 9C shows a first variation of the opening forming pins 21 for forming the openings 6. As shown in FIG. 9C, the opening forming pins 21 for forming the openings 6 may be formed not in a region for forming the third cavity part 17 of the second mold 13 but may be formed only in a region for forming the third cavity part 17 of the first mold 12.

Figure 9D:
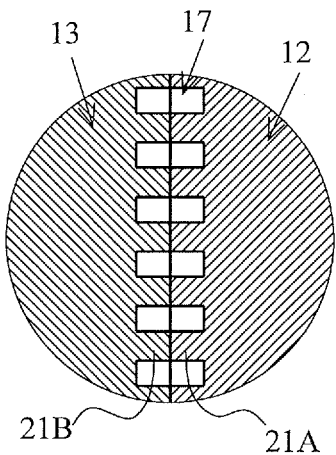
Figures 11A, 11B, 11C:
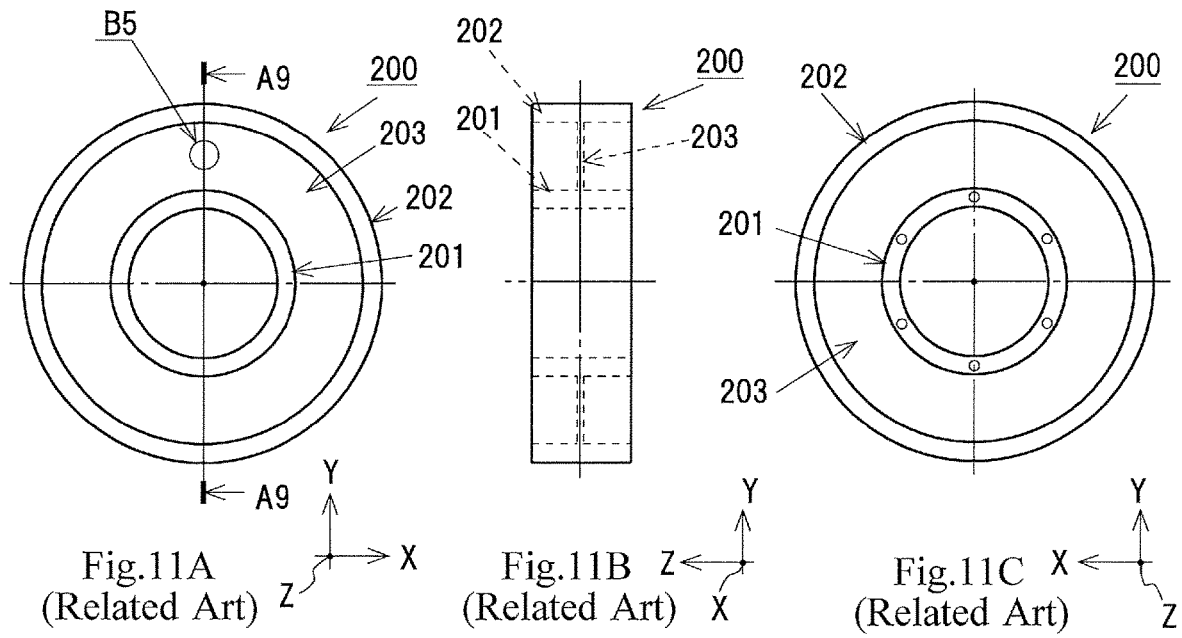
FIGS. 11A-11G show a mesh filter according to second conventional example.
Figures 11D, 11E, 11F:
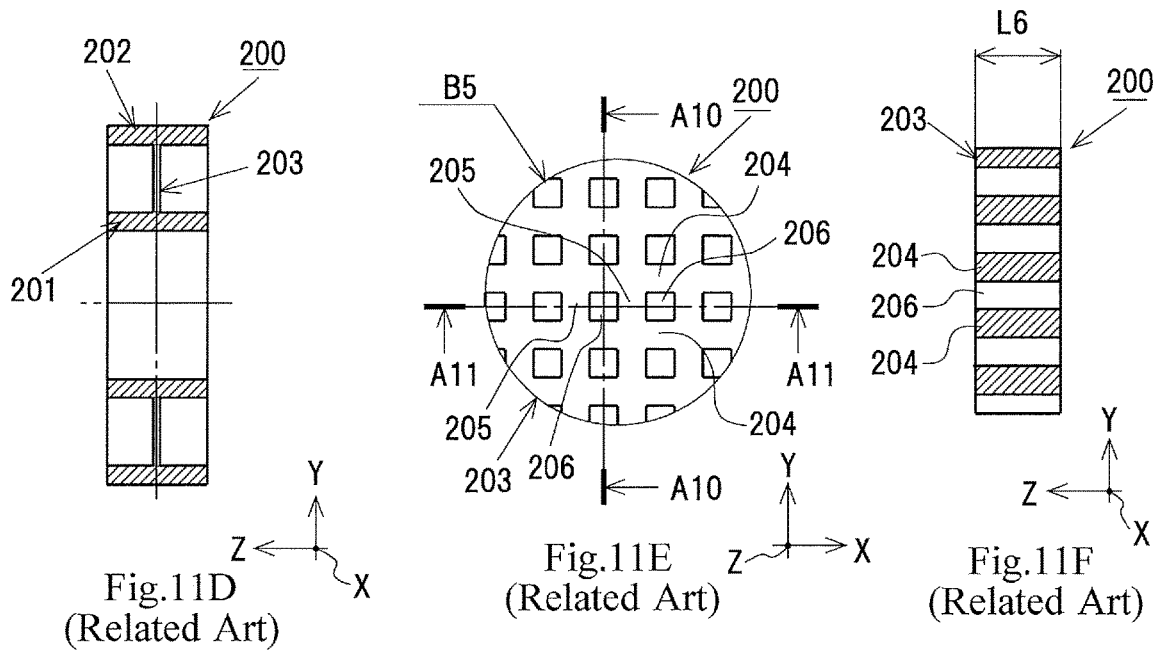
Figure 11G:
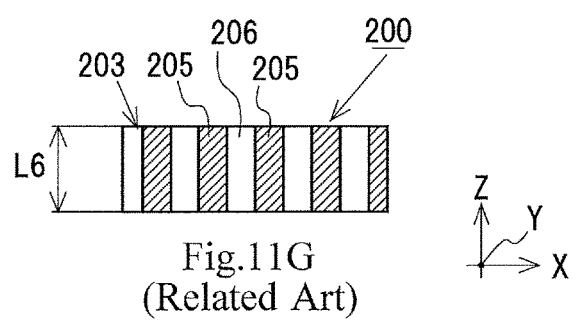

FIG. 9D shows a second variation of the opening forming pins 21 for forming the openings 6. As shown in FIG. 9D, the opening forming pins 21 may be formed to have a portion for molding the third cavity part 17 of the first mold 12 and a portion for molding the third cavity part 17 of the second mold 13 separately therefrom. In this second variation, the height dimensions of each of the opening forming pins 21A, 21B in the first mold 12 and the second mold 13 is made to have a half of the height dimension of the opening forming pins 21 according to the first variation. Also, at the time of mold-clamping of the first mold 12 and the second mold 13, a top surface of the opening forming pin 21A and a top surface of the opening forming pin 21B are matched to each other. The present embodiment can obtain an effect similar to that of the first embodiment.

It is to be noted that, while provided are the examples in which the mesh filter 1 according to each of the embodiments of the present invention is installed to a fuel supply pipe connected to a fuel injection device of an automobile, the mesh filter may be, of course, installed to a middle of an oil pipe channel of a lubrication device or the like of an automobile, and, not limited to the above, may be used in a wide range of technical field such as installing to a pipe channel of a water supply or air supply pipe to remove a foreign substance contained in a fluid (liquid such as water, or gas such as air).

DESCRIPTION OF REFERENCE SIGNS

1: Mesh filter
2: Inner cylinder
2a: Outer circumferential surface
3: Outer cylinder
3a: Inner circumferential surface
4: Filter part
5, 18: Center axis
6: Openings
7, 22: Inscribed circle
11: Injection-molding mold
14: Cavity
15: First cavity part
16: Second cavity part
17: Third cavity part
21: Opening forming pins.

The invention claimed is:

1. An injection-molding method for molding a mesh filter in a cavity of an injection-molding mold, the method comprising:
providing the cavity for forming the mesh filter including a first cavity part for forming a cylindrical inner cylinder of the mesh filter; a second cavity part for forming a cylindrical outer cylinder of the mesh filter surrounding the inner cylinder; and a third cavity part for forming a filter part of the mesh filter connecting an outer circumferential surface of the inner cylinder and an inner circumferential surface of the outer cylinder,
forming the third cavity part along an X-Y plane, in which the X-Y plane is an imaginary plane perpendicular to a center axis of the first cavity part, and the third cavity part is provided with opening forming pins for forming a plurality of regular-octagonal openings which are through holes that open in front and back surfaces of the filter part,
wherein the opening forming pins stand perpendicularly to the X-Y plane, have a regular-octagonal shape thereof when projected on the X-Y plane, have a uniform cross-sectional shape over an entire length thereof, are formed in plurality at regular intervals along the X-axis direction on the X-Y plane and formed in plurality at regular intervals along the Y-axis direction on the X-Y plane, and are configured such that a diameter of an inscribed circle of the regular-octagonal shape is made equivalent to the dimension between the adjacent opening forming pins along the X-axis direction and equivalent to the dimension between the adjacent opening forming pins along the Y-axis direction, thereby forming a plurality of the opening forming pins at regular intervals along a direction at 45° with respect to the X-axis direction, and at regular intervals along a direction at 135° with respect to the X-axis direction,
wherein the interval between a first line and a second line adjacent to the first line of the plurality of opening forming pins formed at regular intervals along the 45°-direction is equivalent to the interval between a third line and a fourth line adjacent to the third line of the plurality of opening forming pins formed at regular intervals along the 135°-direction, and
injecting a melted resin into the first cavity part so as to flow in a gap between the opening forming pins of the third cavity part, and then fill in the second cavity part.

2. The injection-molding method for the mesh filter according to claim 1, wherein:
a fourth cavity part, for forming an inner filter part of the mesh filter, is formed on a radially inward side of the first cavity part,
the fourth cavity part is formed along the X-Y plane up to the central axis, and is provided with inner opening forming pins of the same number as that of inner openings for forming a plurality of regular-octagonal inner openings which are through holes that open in front and back surfaces of the inner filter part,
the inner opening forming pins stand perpendicularly to the X-Y plane, have a regular-octagonal shape thereof when projected on the X-Y plane, have a uniform cross-sectional shape over an entire length thereof, are formed in plurality at regular intervals along the X-axis direction on the X-Y plane and formed in plurality at regular intervals along the Y-axis direction on the X-Y plane, and are configured such that a diameter of an inscribed circle of the regular-octagonal shape is made equivalent to the dimension between the adjacent inner opening forming pins along the X-axis direction and equivalent to the dimension between the adjacent inner opening forming pins along the Y-axis direction, thereby forming a plurality of the inner opening forming pins at regular intervals along a direction at 45° with respect to the X-axis direction, and at regular intervals along a direction at 135° with respect to the X-axis direction,
the interval between a first line and a second line adjacent to the first line of the plurality of inner opening forming pins formed at regular intervals along the 45°-direction is equivalent to the interval between a third line and a fourth line adjacent to the third line of the plurality of inner opening forming pins formed at regular intervals along the 135°-direction, and the melted resin injected in the first cavity part is filled in a gap between the inner opening forming pins of the fourth cavity part.

3. The injection-molding method for the mesh filter according to claim 2, wherein
a diameter of the inscribed circle of each of the opening forming pins is equivalent to a diameter of the inscribed circle of each of the inner opening forming pins.

4. The injection-molding method for the mesh filter according to claim 2, wherein
a diameter of the inscribed circle of each of the opening forming pins is different from a diameter of the inscribed circle of each of the inner opening forming pins.

5. An injection-molding method for a mesh filter molded in a cavity of an injection-molding mold, the method comprising:
providing the cavity for forming the mesh filter including a first cavity part for forming a disk-like or solid round bar-like center part of the mesh filter; a second cavity part for forming a cylindrical outer cylinder of the mesh filter surrounding the center part; and a third cavity part for forming a filter part of the mesh filter connecting an outer circumferential surface of the center part and an inner circumferential surface of the outer cylinder,
forming the third cavity part along an X-Y plane, in which the X-Y plane is an imaginary plane perpendicular to a center axis of the first cavity part, and is provided with opening forming pins for forming a plurality of regular-octagonal openings which are through holes that open in front and back surfaces of the filter part,
wherein the opening forming pins stand perpendicularly to the X-Y plane, have a regular-octagonal shape thereof when projected on the X-Y plane, have a uniform cross-sectional shape over an entire length thereof, are formed in plurality at regular intervals along the X-axis direction on the X-Y plane and formed in plurality at regular intervals along the Y-axis direction on the X-Y plane, and are configured such that a diameter of an inscribed circle of the regular-octagonal shape is made equivalent to the dimension between the adjacent opening forming pins along the X-axis direction and equivalent to the dimension between the adjacent opening forming pins along the Y-axis direction, thereby forming a plurality of the opening forming pins at regular intervals along a direction at 45° with respect to the X-axis direction and at regular intervals along a direction at 135° with respect to the X-axis direction,
wherein the interval between a first line and a second line adjacent to the first line of the plurality of opening forming pins formed at regular intervals along the 45°-direction is equivalent to the interval between a third line and a fourth line adjacent to the third line of the plurality of opening forming pins formed at regular intervals along the 135°-direction, and
injecting a melted resin into the first cavity part so as to flow in a gap between the opening forming pins of the third cavity part, and then fill in the second cavity part.

6. An injection-molding mold for a mesh filter, comprising:
a cavity for forming the mesh filter including: a first cavity part for forming a cylindrical inner cylinder of the mesh filter; a second cavity part for forming a cylindrical outer cylinder of the mesh filter surrounding the inner cylinder; and a third cavity part for forming a filter part of the mesh filter connecting an outer circumferential surface of the inner cylinder and an inner circumferential surface of the outer cylinder,
wherein the third cavity part is formed along an X-Y plane, in which the X-Y plane is an imaginary plane perpendicular to a center axis of the first cavity part, and is provided with opening forming pins for forming a plurality of regular-octagonal openings which are through holes that open in front and back surfaces of the filter part,
wherein the opening forming pins stand perpendicularly to the X-Y plane, have a regular-octagonal shape thereof when projected on the X-Y plane, have a uniform cross-sectional shape over an entire length thereof, are formed in plurality at regular intervals along the X-axis direction on the X-Y plane and formed in plurality at regular intervals along the Y-axis direction on the X-Y plane, and are configured such that a diameter of an inscribed circle of the regular-octagonal shape is made equivalent to the dimension between the adjacent opening forming pins along the X-axis direction and equivalent to the dimension between the adjacent opening forming pins along the Y-axis direction, thereby forming a plurality of the opening forming pins at regular intervals along a direction at 45° with respect to the X-axis direction, and at regular intervals along a direction at 135° with respect to the X-axis direction,
wherein the interval between a first line and a second line adjacent to the first line of the plurality of opening forming pins formed at regular intervals along the 45°-direction is equivalent to the interval between a third line and a fourth line adjacent to the third line of the plurality of opening forming pins formed at regular intervals along the 135°-direction, and
a gate for injecting a melted resin, the gate being arranged in the first cavity part in such a manner that the melted resin injected in the first cavity part flows in a gap between the opening forming pins of the third cavity part, and the melted resin flowed in the third cavity part then fills in the second cavity part.

7. The injection-molding mold for the mesh filter according to claim 6, wherein:
a fourth cavity part, for forming an inner filter part of the mesh filter, is formed on a radially inward side of the first cavity part,
the fourth cavity part is formed along the X-Y plane up to the central axis, and is provided with inner opening forming pins of the same number as that of inner openings for forming a plurality of regular-octagonal inner openings which are through holes that open in front and back surfaces of the inner filter part,
the inner opening forming pins stand perpendicularly to the X-Y plane, have a regular-octagonal shape thereof when projected on the X-Y plane, have a uniform cross-sectional shape over an entire length thereof, are formed in plurality at regular intervals along the X-axis direction on the X-Y plane and formed in plurality at regular intervals along the Y-axis direction on the X-Y plane, and are configured such that a diameter of an inscribed circle of the regular-octagonal shape is made equivalent to the dimension between the adjacent inner opening forming pins along the X-axis direction and equivalent to the dimension between the adjacent inner opening forming pins along the Y-axis direction, thereby forming a plurality of the inner opening forming pins at regular intervals along a direction at 45° with respect to the X-axis direction, and at regular intervals along a direction at 135° with respect to the X-axis direction, the interval between a first line and a second line adjacent to the first line of the plurality of inner opening forming pins formed at regular intervals along the 45°-direction is equivalent to the interval between a third line and a fourth line adjacent to the third line of the plurality of inner opening forming pins formed at regular intervals along the 135°-direction, and the melted resin injected in the first cavity part is filled in a gap between the inner opening forming pins of the fourth cavity part.

8. The injection-molding mold for the mesh filter according to claim 7, wherein
a diameter of the inscribed circle of each of the opening forming pins is equivalent to a diameter of the inscribed circle of each of the inner opening forming pins.

9. The injection-molding mold for the mesh filter according to claim 7, wherein
a diameter of the inscribed circle of each of the opening forming pins is different from a diameter of the inscribed circle of each of the inner opening forming pins.

10. An injection-molding mold for a mesh filter, comprising:
a cavity for forming the mesh filter including a first cavity part for forming a disk-like or solid round bar-like center part of the mesh filter; a second cavity part for forming an outer cylinder of the mesh filter surrounding the center part; and a third cavity part for forming a filter part of the mesh filter connecting an outer circumferential surface of the center part and an inner circumferential surface of the outer cylinder,
wherein the third cavity part is formed along an X-Y plane, in which the X-Y plane is an imaginary plane perpendicular to a center axis of the first cavity part, and is provided with opening forming pins for forming a plurality of regular-octagonal openings which are through holes that open in front and back surfaces of the filter part,
wherein the opening forming pins stand perpendicularly to the X-Y plane, have a regular-octagonal shape thereof when projected on the X-Y plane, have a uniform cross-sectional shape over an entire length thereof, are formed in plurality at regular intervals along the X-axis direction on the X-Y plane and formed in plurality at regular intervals along the Y-axis direction on the X-Y plane, and are configured such that a diameter of an inscribed circle of the regular-octagonal shape is made equivalent to the dimension between the adjacent opening forming pins along the X-axis direction and equivalent to the dimension between the adjacent opening forming pins along the Y-axis direction, thereby forming the opening forming pins in plurality at regular intervals along a direction at 45° with respect to the X-axis direction and in plurality at regular intervals along a direction at 135° with respect to the X-axis direction,
wherein the interval between a first line and a second line adjacent to the first line of the opening forming pins formed in plurality at regular intervals along the 45°-direction is equivalent to the interval between a third line and a fourth line adjacent to the third line of the opening forming pins formed in plurality at regular intervals along the 135°-direction, and a gate for injecting a melted resin arranged in the first cavity part in such a manner that the melted resin injected in the first cavity part flows in a gap between the opening forming pins of the third cavity part, and the melted resin flowed in the third cavity part then fills in the second cavity part.

11. A mesh filter integrally comprising a cylindrical inner cylinder, a cylindrical outer cylinder surrounding the inner cylinder, and a filter part connecting an outer circumferential surface of the inner cylinder and an inner circumferential surface of the outer cylinder,
wherein the filter part is formed along a X-Y plane, in which the X-Y plane is an imaginary plane perpendicular to a center axis of the inner cylinder, and is provided with a plurality of openings having a regular-octagonal opening edge in the X-Y plane and being through holes that open in front and back surfaces,
wherein the openings have a uniform cross-sectional shape over an entire length thereof, are formed in plurality at regular intervals along the X-axis direction on the X-Y plane and formed in plurality at regular intervals along the Y-axis direction on the X-Y plane, and are configured such that a diameter of an inscribed circle of the regular-octagonal shape is made equivalent to the dimension between the adjacent openings along the X-axis direction and equivalent to the dimension between the adjacent openings along the Y-axis direction, thereby forming a plurality of openings at regular intervals along a direction at 45° with respect to the X-axis direction, and at regular intervals along a direction at 135° with respect to the X-axis direction, and
wherein the interval between a first line and a second line adjacent to the first line of the plurality of openings formed at regular intervals along the 45°-direction is equivalent to the interval between a third line and a fourth line adjacent to the third line of the plurality of openings formed at regular intervals along the 135°-direction.

12. The mesh filter according to claim 11, wherein:
an inner filter part is formed from the inner cylinder to the center axis,
the inner filter part is provided with a plurality of inner openings having a regular-octagonal opening edge in the X-Y plane and being through holes that open in front and back surfaces of the inner filter part,
the inner openings are formed in plurality at regular intervals along the X-axis direction on the X-Y plane and formed in plurality at regular intervals along the Y-axis direction on the X-Y plane, and are configured such that a diameter of an inscribed circle of the regular-octagonal shape is made equivalent to the dimension between the adjacent inner openings along the X-axis direction and equivalent to the dimension between the adjacent inner openings along the Y-axis direction, thereby forming a plurality of inner openings at regular intervals along a direction at 45° with respect to the X-axis direction, and at regular intervals along a direction at 135° with respect to the X-axis direction, and
the interval between a first line and a second line adjacent to the first line of the plurality of inner openings formed at regular intervals along the 45°-direction is equivalent to the interval between a third line and a fourth line adjacent to the third line of the plurality of inner openings formed at regular intervals along the 135°-direction.

13. The mesh filter according to claim 12, wherein a diameter of the inscribed circle of each of the openings is equivalent to a diameter of the inscribed circle of each of the inner openings.

14. The mesh filter according to claim 12, wherein a diameter of the inscribed circle of each of the openings is different from a diameter of the inscribed circle of each of the inner openings.

15. A mesh filter comprising a disk-like or solid round bar-like center part, an outer cylinder surrounding the center part, and a filter part connecting an outer circumferential surface of the center part and an inner circumferential surface of the outer cylinder, wherein:

the filter part is formed along a X-Y plane, in which the X-Y plane is an imaginary plane perpendicular to a center axis of the center part, and is provided with a plurality of openings having a regular-octagonal opening edge in the X-Y plane and being through holes that open in front and back surfaces, the openings are formed in plurality at regular intervals along the X-axis direction on the X-Y plane and formed in plurality at regular intervals along the Y-axis direction on the X-Y plane, and are configured such that a diameter of an inscribed circle of the regular-octagonal shape is made equivalent to the dimension between the adjacent openings along the X-axis direction and equivalent to the dimension between the adjacent openings along the Y-axis direction, thereby forming a plurality of openings at regular intervals along a direction at 45° with respect to the X-axis direction, and at regular intervals along a direction at 135° with respect to the X-axis direction, and the interval between a first line and a second line adjacent to the first line of the plurality of openings formed at regular intervals along the 45°-direction is equivalent to the interval between a third line and a fourth line adjacent to the third line of the plurality of openings formed at regular intervals along the 135°-direction.

* * * * *